United States Patent
Teranishi et al.

(10) Patent No.: US 12,043,527 B2
(45) Date of Patent: Jul. 23, 2024

(54) WORK MACHINE AND VIDEO DISPLAY CONTROL METHOD FOR WORK MACHINE

(71) Applicant: KOBELCO CONSTRUCTION MACHINERY CO., LTD., Hiroshima (JP)

(72) Inventors: Kentaro Teranishi, Hyogo (JP); Arisa Nakamura, Hyogo (JP); Shintaro Sasai, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 302 days.

(21) Appl. No.: 17/610,493

(22) PCT Filed: May 14, 2020

(86) PCT No.: PCT/JP2020/019311
§ 371 (c)(1),
(2) Date: Nov. 11, 2021

(87) PCT Pub. No.: WO2020/235450
PCT Pub. Date: Nov. 26, 2020

(65) Prior Publication Data
US 2022/0219954 A1 Jul. 14, 2022

(30) Foreign Application Priority Data

May 17, 2019 (JP) .................................. 2019-093962

(51) Int. Cl.
*B66C 23/94* (2006.01)
*B66C 13/00* (2006.01)
(Continued)

(52) U.S. Cl.
CPC .............. *B66C 23/94* (2013.01); *B66C 13/00* (2013.01); *B66C 13/18* (2013.01); *B66C 23/86* (2013.01);
(Continued)

(58) Field of Classification Search
CPC ......... B66C 23/94; B66C 13/00; B66C 13/18; B66C 23/86; B66C 23/36;
(Continued)

(56) References Cited

U.S. PATENT DOCUMENTS

2015/0138360 A1   5/2015   Kowatari et al.
2018/0274206 A1   9/2018   Kozui et al.
(Continued)

FOREIGN PATENT DOCUMENTS

EP     2 899 496 A1     7/2015
JP     2002-327470 A    11/2002
(Continued)

OTHER PUBLICATIONS

Translation of IDS provided JP201906018A, 2019.*
(Continued)

*Primary Examiner* — Abby Y Lin
*Assistant Examiner* — Dylan Brandon Mooney
(74) *Attorney, Agent, or Firm* — Oblon, McClelland, Maier & Neustadt, L.L.P.

(57) ABSTRACT

An obstacle detection device detects an obstacle existing in one or more monitoring areas that are set to correspond to a movable part. A state determination unit determines whether a state of the actuator is a standby state or a suspended state under circumstances where the actuator is at a stop. On determination that the state of the actuator is the standby state, a display control unit executes automatic image output that is processing for causing a display device to display a monitoring image corresponding to a monitoring area in
(Continued)

which the obstacle is detected out of the one or more monitoring areas. On determination that the state of the actuator is the suspended state, the display control unit stops the execution of the automatic image output.

10 Claims, 10 Drawing Sheets

(51) Int. Cl.
*B66C 13/18* (2006.01)
*B66C 23/36* (2006.01)
*B66C 23/86* (2006.01)

(52) U.S. Cl.
CPC ...... *B66C 23/36* (2013.01); *B66C 2700/0371* (2013.01)

(58) Field of Classification Search
CPC ............ B66C 2700/0371; B66C 13/46; B66C 15/045; E02F 9/24; E02F 9/261; H04N 7/183
See application file for complete search history.

(56) References Cited

U.S. PATENT DOCUMENTS

| | | | | |
|---|---|---|---|---|
| 2019/0170879 | A1* | 6/2019 | Kinoshita | G01B 21/18 |
| 2019/0308851 | A1* | 10/2019 | Gustafsson | B66C 23/48 |
| 2020/0040552 | A1 | 2/2020 | Shibata et al. | |

FOREIGN PATENT DOCUMENTS

| | | |
|---|---|---|
| JP | 2018-152685 A | 9/2018 |
| JP | 2018-159194 A | 10/2018 |
| JP | 2019-60108 A | 4/2019 |
| JP | 2019-65567 A | 4/2019 |

OTHER PUBLICATIONS

Extended European Search Report issued May 10, 2022 in European Patent Application No. 20808757.7, 5 pages.
International Search Report mailed on Jul. 28, 2020 in PCT/JP2020/019311 filed on May 14, 2020, 2 pages.

* cited by examiner

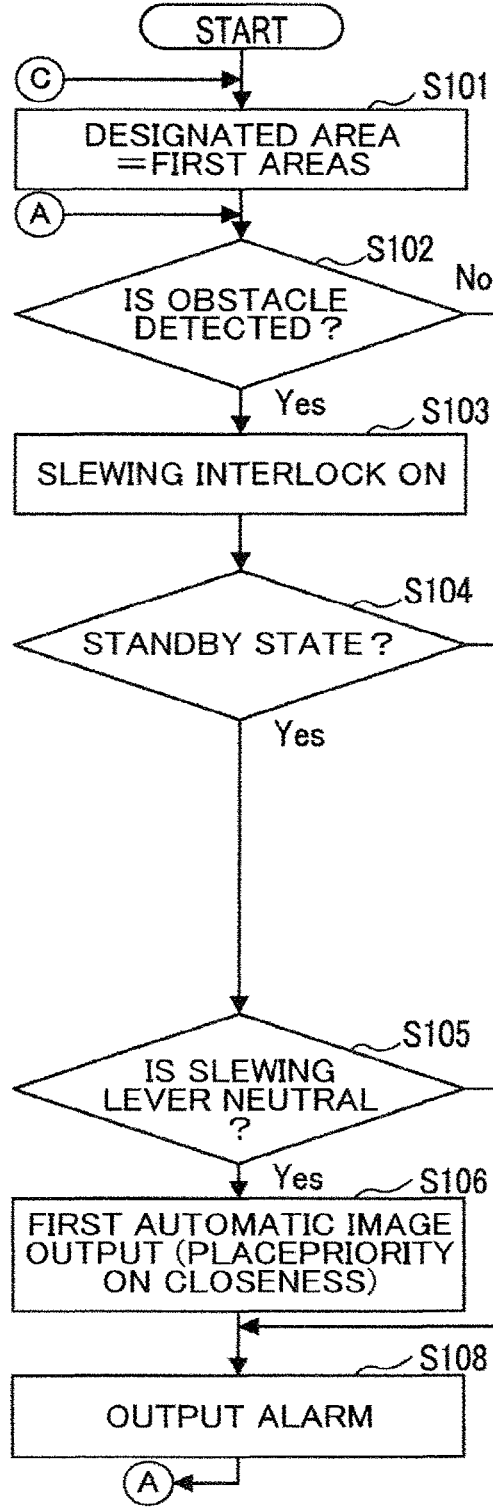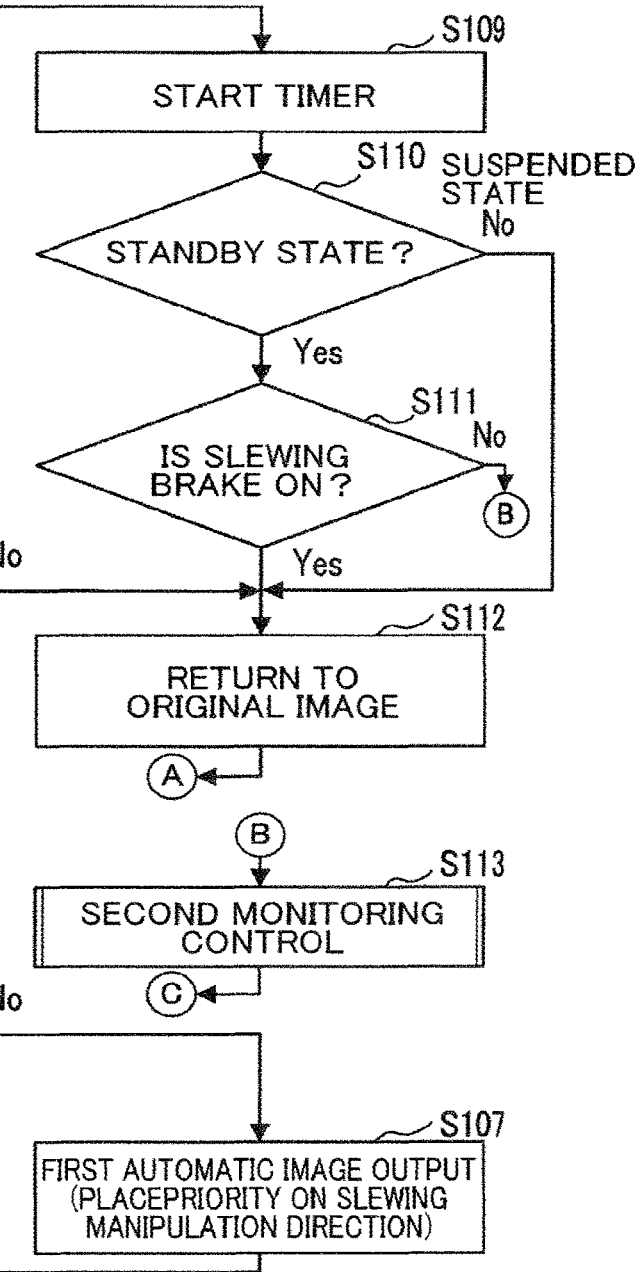
FIG.6

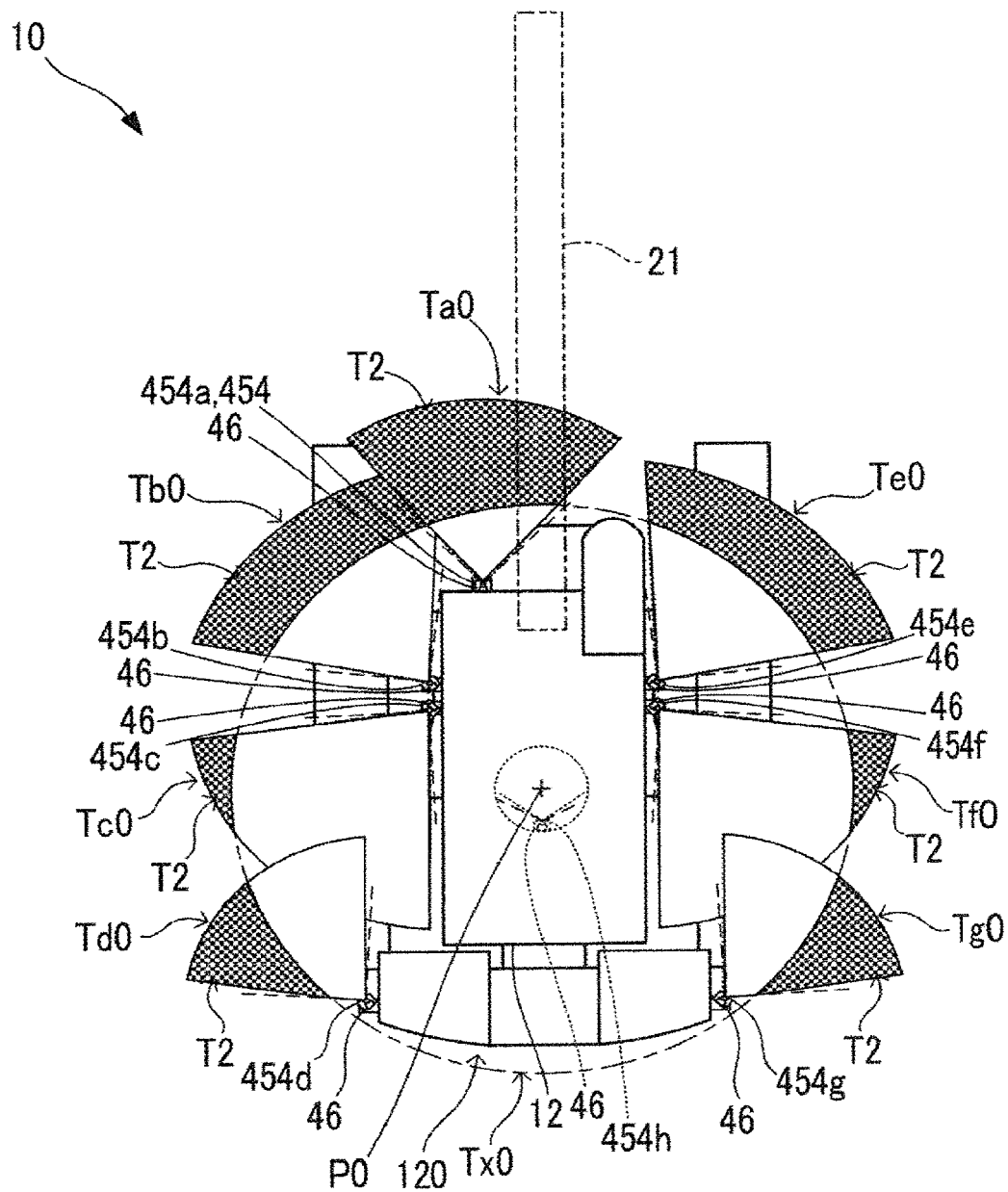

WORK MACHINE AND VIDEO DISPLAY CONTROL METHOD FOR WORK MACHINE

TECHNICAL FIELD

The present invention relates to a work machine and an image display control method for the work machine.

BACKGROUND ART

A work machine such as a crane includes a movable part such as a stewing body and a winch drum, and a hydraulic actuator that drives the movable part such as a hydraulic motor. Furthermore, the work machine may include a camera that captures images around the movable part.

In the above-described case, the work machine includes a controller that causes a display device in a cab to selectively display one of a plurality of candidate images including, for example, a monitoring image of the movable part. With this configuration, an operator can confirm on a screen of the display device whether there is a dangerous situation in which the movable part is likely to come into contact with an obstacle such as a person.

For example, a technique is known in which the work machine includes a plurality of cameras and a plurality of proximity sensors corresponding to the plurality of cameras, and the controller automatically causes the display device to display the captured image of the camera corresponding to the proximity sensor that detects the obstacle (see, for example, Patent Literature 1). With this technique, the operator can quickly check the image of an area where the obstacle is detected with the display device without time and effort.

In that connection, when an operator is checking information about various states on the screen of the display device in the cab at a work site, another worker than the operator may perform various preparatory work around the movable part of the work machine.

In the above-described case, if the captured image of the camera is automatically displayed on the display device every time the proximity sensor detects the worker, the work of checking the information on the screen of the display device by the operator may be hindered.

Meanwhile, if a function of automatic control of the image display in response to the detection of the obstacle is stopped in response to the manipulation by the operator in order to avoid hindrance of the checking work, the operator may forget to perform the manipulation of releasing stop of the automatic control function of the image display after the checking work.

CITATION LIST

Patent Literature

Patent Literature 1: Japanese Patent Application Laid-Open No. 2002-327470

SUMMARY OF INVENTION

An object of the present invention is to provide a work machine and an image display control method for the work machine that can avoid unnecessary, automatic switching of display contents of the display device even unless the operator stops the function of automatic control of the image display.

A work machine according to one aspect of the present invention includes a movable part, an actuator, a drive manipulation unit, a drive control unit, a preparatory manipulation unit, a state switching unit, a display device, an obstacle detection device, a state determination unit, and a display control unit. The actuator drives the movable part. The drive manipulation unit receives a drive manipulation instructing the actuator to operate. The drive control unit controls the operation of the actuator in response to the drive manipulation. The preparatory manipulation unit receives a preparatory manipulation instructing the actuator to prepare for the operation. The state switching unit shifts a state of the actuator in response to the preparatory manipulation from a suspended state in which the actuator is blocked from being started by control of the drive control unit to a standby state in which the actuator is able to be started by the control of the drive control unit. The display device is configured to display an image. The obstacle detection device detects an obstacle existing in one or more monitoring areas that are set to correspond to the movable part. The state determination unit determines whether the state of the actuator is the standby state or the suspended state under circumstances where the actuator is at a stop. On determination that the state of the actuator is the standby state, the display control unit executes automatic image output that is processing for causing the display device to display a monitoring image that is an image corresponding to a monitoring area in which the obstacle is detected out of the one or more monitoring areas, and on determination that the state of the actuator is the suspended state, the display control unit stops the execution of the automatic image output.

An image display control method for a work machine according to another aspect of the present invention is a control method for the work machine including the movable part, the actuator, the drive manipulation unit, the drive control unit, the preparatory manipulation unit, the state switching unit, the display device, and the obstacle detection device. The image display control method includes: as processes to be executed by a processor included in the work machine, a first process of determining whether the state of the actuator is the standby state or the suspended state under circumstances where the actuator is at a stop; and a second process. On determination in the first process that the state of the actuator is the standby state, automatic image output is executed in the second process, the automatic image output being processing for causing the display device to display a monitoring image corresponding to a monitoring area in which the obstacle is detected out of the one or more monitoring areas. On determination in the first process that the state of the actuator is the suspended state, the execution of the automatic image output is stopped in the second process.

The work machine and the image display control method make it possible to provide a work machine and an image display control method for the work machine that can avoid unnecessary, automatic switching of display contents of the display device even unless the operator stops the function of automatic control of the image display.

BRIEF DESCRIPTION OF DRAWINGS

FIG. 6 is a flowchart showing one example of a procedure for first monitoring control in the crane according to the embodiment.

FIG. 10 is a plan view showing a second monitoring area in the crane according to the embodiment.

DESCRIPTION OF EMBODIMENT

Hereinafter, an embodiment of the present invention will be described with reference to the drawings. Note that the following embodiment is one example of embodying the present invention, and does not limit the technical scope of the present invention.

[Schematic Configuration of Crane 10]

A crane 10 according to the embodiment of the present invention is one example of a stewing work machine. The crane 10 is a work machine that hoists and moves a hoist load 9. Hereinafter, an example in which the crane 10 is a mobile crane will be described.

Figure 1:
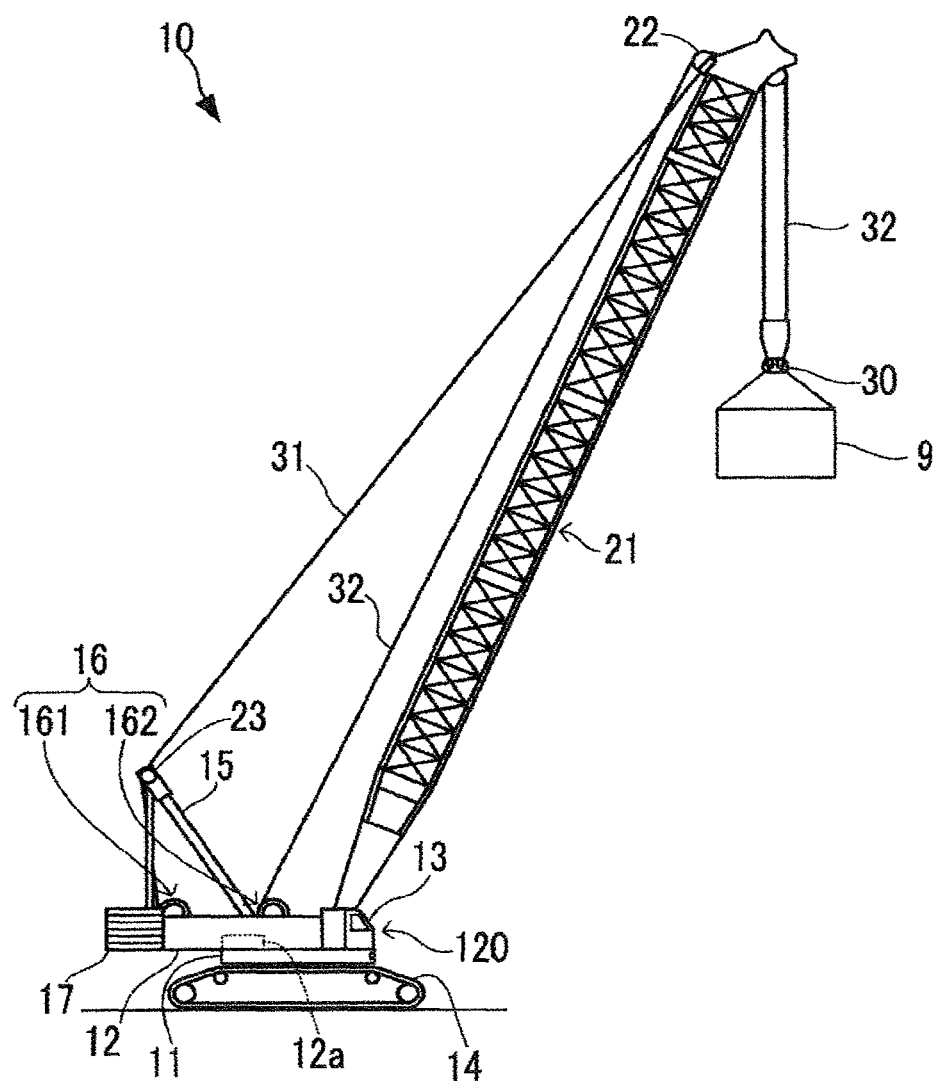
FIG. 1 is a side view of a crane according to an embodiment.

As shown in FIG. 1, the crane 10 includes a lower travelling body 11, an upper stewing body 12, a boom 21, a hook 30, a luffing rope 31, and a hoisting rope 32. The upper stewing body 12 includes a stewing frame slewably supported by the lower travelling body 11, a cab 13, a gantry 15, winch devices 16, and a counterweight 17. The winch devices 16 include a first winch device 161 and a second winch device 162.

The gantry 15 is fixed to the stewing frame in a standing up state from the stewing frame of the upper stewing body 12. The counterweight 17 is coupled with the stewing frame of the upper stewing body 12 and is disposed at the rear of the stewing frame.

The lower travelling body 11 is a pedestal that supports the upper stewing body 12 to be able to slew. The upper stewing body 12 is located on an upper part of the lower travelling body 11 to be able to slew with respect to the lower travelling body 11. The upper stewing body 12 is driven to slew by a slewing motor 441 located on the lower travelling body 11 (see FIG. 2). The lower travelling body 11 is one example of a lower base.

The cab 13 is a control cabin. The cab 13 is coupled with the slewing frame of the upper slewing body 12 and is disposed at the front of the stewing frame.

The upper slewing body 12, the boom 21, the hook 30, the luffing rope 31, and the hoisting rope 32 constitute a slewing part 120 that slews integrally.

The slewing motor 441 is a hydraulic motor. The crane 10 also includes a slewing brake device 440 that exerts braking force on the slewing motor 441 (see FIG. 2). The slewing brake device 440 is a so-called negative brake, and exerts braking force on the slewing motor 441 under circumstances where no hydraulic pressure is applied.

The crane 10 shown in FIG. 1 is a mobile crane. Therefore, the lower travelling body 11 includes a travelling device 14. The travelling device 14 is coupled with a frame of the lower travelling body 11. FIG. 1 shows an example in which the travelling device 14 is a crawler type device.

The boom 21 is supported by the upper slewing body 12 by coupling a root thereof with the slewing frame of the upper slewing body 12. The boom 21 is formed to extend in one direction from the slewing frame of the upper slewing body 12 and supports the hoisting rope 32 that suspends the hoist load 9. The boom 21 is configured to tuff around the root coupled with the upper slewing body 12.

The hoisting rope 32 is hung on a boom point idler sheave 22 provided at the tip of the boom 21. The luffing rope 31 is hung on a gantry sheave 23 provided at the tip of the gantry 15.

The first winch device 161 supports the boom 21 via the lulling rope 31. Meanwhile, the second winch device 162 supports the hook 30 via the hoisting rope 32.

The first winch device 161 changes an elevation angle of the boom 21 by winding or unwinding the luffing rope 31. That is, the boom 21 is driven by the first winch device 161 and the luffing rope 31 such that the elevation angle can be changed.

The second winch device 162 causes the hook 30 to move up and down by winding or unwinding the hoisting rope 32.

The hoist load 9 is hung on the hook 30. The counterweight 17 balances loads of the boom 21, the hook 30, and the hoist load 9.

Figure 2:
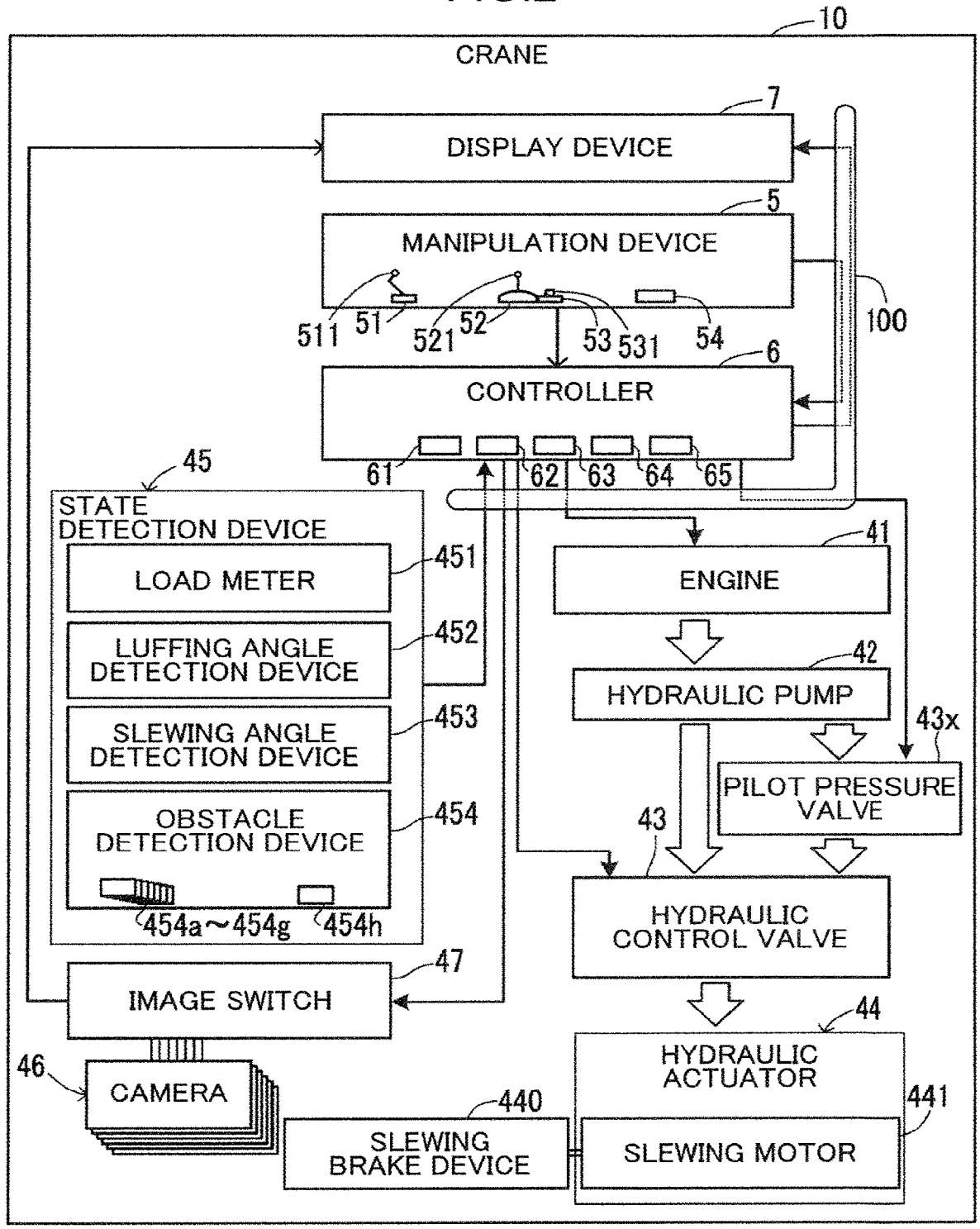
FIG. 2 is a block diagram showing a configuration of control-related devices in the crane according to the embodiment.

As shown in FIG. 2, the crane 10 includes: drive-system devices such as an engine 41, a hydraulic pump unit 42, a hydraulic control valve 43, a pilot pressure valve 43x, and a plurality of hydraulic actuators 44; a manipulation device 5; a controller 6; and a display device 7.

Devices for human interface such as the manipulation device 5 and the display device 7 are located in the cab 13. Furthermore, the crane 10 also includes a state detection device 45 that detects states of various devices included in the crane 10, a plurality of cameras 46, and an image switch 47.

The manipulation device 5 is a device that receives manipulations of an operator. The display device 7 is a device that displays information, for example, a panel display device such as a liquid crystal display unit. In addition, the display device 7 can also display a monitoring image captured by the camera 46.

The manipulation device 5 includes a boarding and alighting cutoff device 51, a stewing manipulation device 52, a slewing brake manipulation device 53, a manipulation input device 54, and the like.

The boarding and alighting cutoff device 51 includes a boarding and alighting cutoff lever 511. In response to two types of manipulations on the boarding and alighting cutoff lever 511, the boarding and alighting cutoff device 51 outputs, to the controller 6, a signal instructing a state of the pilot pressure valve 43x to be switched. The controller 6 outputs a pilot pressure control signal according to details of the manipulation on the boarding and alighting cutoff lever 511 to the pilot pressure valve 43x.

The slewing manipulation device 52 includes a slewing lever 521 that can be displaced in two directions from a neutral position. The slewing manipulation device 52 is one example of a drive manipulation unit. According to a manipulating direction and manipulating amount on the slewing lever 521, the slewing manipulation device 52 outputs, to the controller 6, a manipulation signal instructing a rotation direction and rotation speed of the slewing motor 441. According to details of the manipulation on the slewing lever 521, the controller 6 controls a part of the hydraulic control valve 43 corresponding to the slewing motor 441. Specifically, the control is as follows.

In the present embodiment, the hydraulic control valve 43 includes a slewing switching valve and one pair of electromagnetic proportional valves. The hydraulic pump unit 42 includes a main pump that discharges working oil and a pilot pump that discharges pilot oil. The slewing switching valve is interposed between the main pump and the slewing motor 441. The slewing switching valve is a pilot-operated hydraulic switching valve including one pair of pilot ports. The slewing motor 441 includes one pair of ports that receive the supply of working oil. The one pair of electromagnetic proportional valves is interposed between the pilot pump and the one pair of pilot ports of the slewing switching valve. One of the one pair of electromagnetic proportional valves is connected to one of the one pair of pilot ports of the slewing switching valve, and the other of the one pair of electromagnetic proportional valves is connected to the other of the one pair of pilot ports of the slewing switching valve. The pilot pressure valve 43x is interposed between the pilot pump and the one pair of electromagnetic proportional valves.

On receipt of input of the manipulation signal corresponding to the manipulating direction and manipulating amount on the slewing lever 521, the controller 6 outputs a drive control signal according to the manipulating amount to one of the one pair of electromagnetic proportional valves corresponding to the manipulating direction. The one electromagnetic proportional valve to which the drive control signal is input performs an opening and closing operation to allow the pilot pressure according to the drive control signal to be supplied to the pilot port corresponding to the one electromagnetic proportional valve out of the one pair of pilot ports of the slewing switching valve.

By displacement of a spool in a direction according to the pilot port with a stroke according to the pilot pressure, the slewing switching valve selectively guides the working oil for driving the slewing motor 441 from the main pump to one of the one pair of ports of the slewing motor 441, and adjusts a slewing flow rate, which is a flow rate of the working oil supplied to the slewing motor 441, to the flow rate according to the stroke.

The slewing brake manipulation device 53 includes a brake button 531. In response to an ON manipulation or OFF manipulation on the brake button 531, the slewing brake manipulation device 53 outputs, to the controller 6, a signal instructing the slewing brake device 440 to be switched to the brake ON state or brake OFF state.

According to details of the manipulation on the brake button 531, the controller 6 switches the slewing brake device 440 to the brake ON state or brake OFF state. The brake ON state is a state of applying braking force to the slewing motor 441, and the brake OFF state is a state of releasing the braking force on the slewing motor 441.

Note that the brake ON state means the brake state of the slewing brake device 440, and the brake OFF state means the brake release state of the slewing brake device 440. In addition, the ON manipulation and the OFF manipulation on the brake button 531 are one example of the brake manipulation and the brake release manipulation, respectively.

The manipulation input device 54 receives information input by the operator. For example, the manipulation input device 54 is a touch panel integrally configured with the display device 7, or the like. In addition, the manipulation input device 54 may be a device that receives information input by a voice manipulation of the operator.

The state detection device 45 includes a load meter 451, a luffing angle detection device 452, a slewing angle detection device 453, and an obstacle detection device 454. The controller 6 is configured to communicate with other devices such as the state detection device 45 and the manipulation device 5 through a vehicle-mounted network 100 such as a controller area network (CAN). Various detection results of the state detection device 45 are transmitted to the controller 6 through the vehicle-mounted network 100.

The load meter 451 detects weight of the hoist load 9. The lulling angle detection device 452 includes a sensor that detects a luffing angle of the boom 21, that is, an elevation angle of the boom 21. The slewing angle detection device 453 includes a sensor that detects an angle at which the upper slewing body 12 slews from a reference direction of the lower travelling body 11.

The obstacle detection device 454 includes at least one sensor that detects an obstacle existing in a plurality of monitoring areas T0 set in advance with respect to the upper slewing body 12. The obstacle is mainly a person.

In the present embodiment, the obstacle detection device 454 is configured to individually detect the obstacle existing in each of eight monitoring areas T0 including a front area Ta0, front and left area Tb0, left side area Tc0, rear and left area Td0, front and right area Te0, right side area Tf0, rear and right area Tg0, and lower center area Th0.

The front area Ta0, front and left area Tb0, left side area Tc0, rear and left area Td0, front and right area Te0, right side area Tf0, and rear and right area Tg0 are areas around the upper slewing body 12. In the following description, these seven monitoring areas T0 may be referred to as outer peripheral monitoring areas.

Meanwhile, the lower center area Th0 is an area in a maintenance hole 12a formed at the bottom of the upper slewing body 12.

In the present embodiment, the obstacle detection device 454 includes seven time of flight (TOF) sensor units 454a to 454g corresponding to the seven monitoring areas T0 (the outer peripheral monitoring areas), and a motion sensor 454h corresponding to the lower center area Th0.

Each of the TOF sensor units 454a to 454g detects the obstacle existing in a designated area set within a unique monitoring range, and detects the three-dimensional position of the obstacle.

Figure 4:
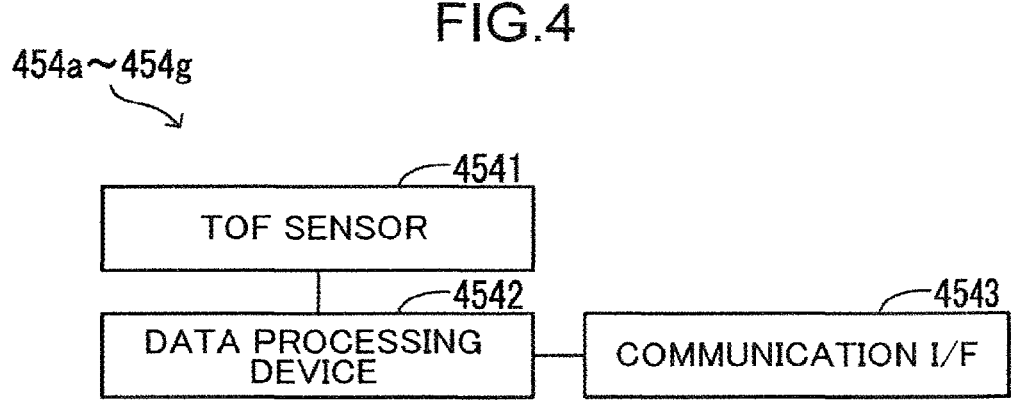
FIG. 4 is a block diagram showing a configuration of TOF sensor units in the crane according to the embodiment.
Figure 5:
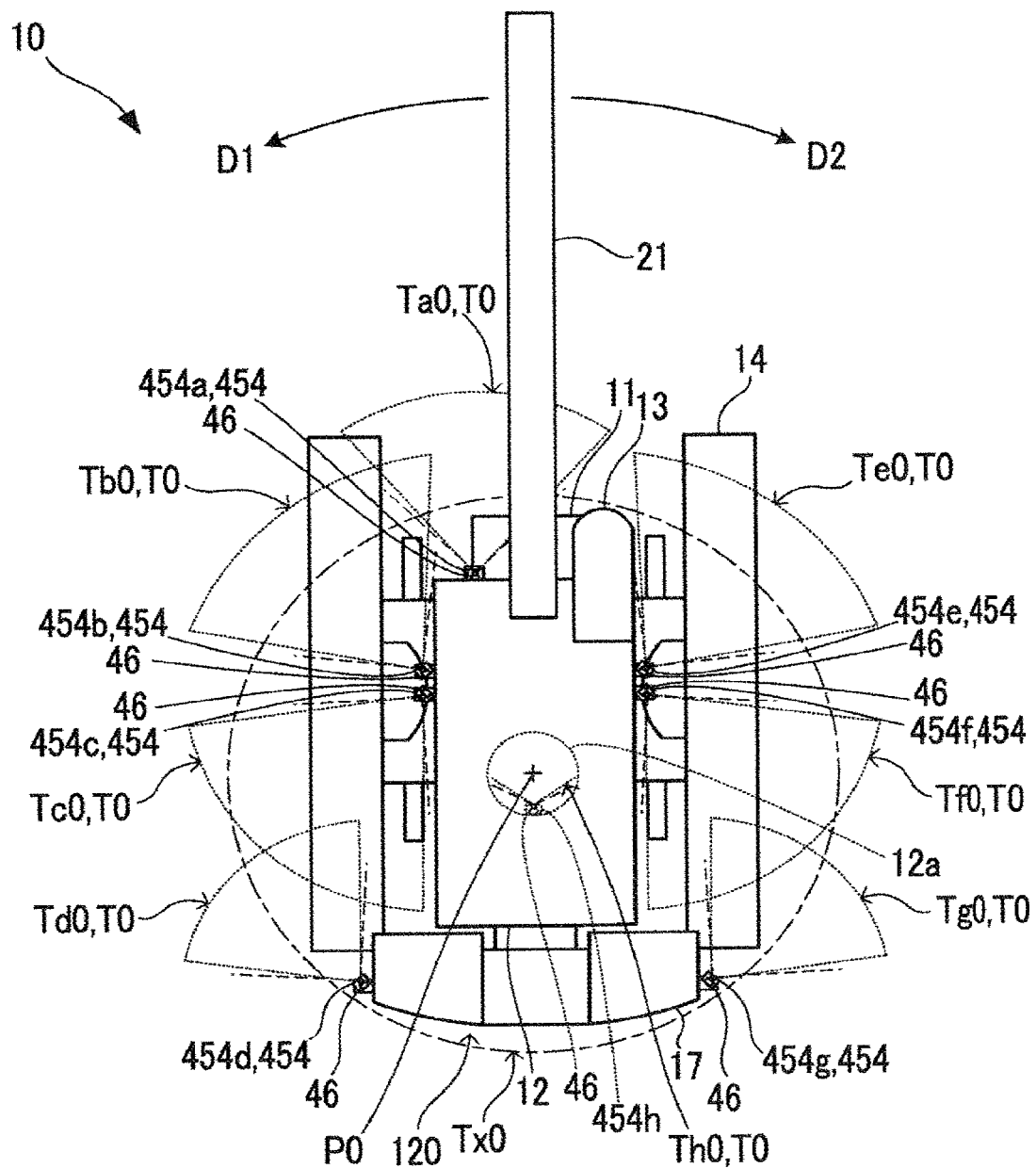
FIG. 5 is a layout diagram of an obstacle detection device and monitoring cameras in the crane according to the embodiment.

As shown in FIG. 4, each of the TOF sensor units 454a to 454g includes a TOF sensor 4541 that uses infrared light to detect the distance to the obstacle for each two-dimensional pixel in the visual field range. That is, the TOF sensor 4541 is configured to detect the three-dimensional position of the obstacle in the visual field range. The visual field range is one example of the unique monitoring range. In the present embodiment, each TOF sensor 4541 is attached to the upper slewing body 12, but the attachment position of the TOF sensor 4541 is not limited to the upper slewing body 12.

Furthermore, each of the TOF sensor units 454a to 454g includes a data processing device 4542 and a communication interface 4543. The communication interface 4543 is a device that communicates with other devices such as the controller 6 through the vehicle-mounted network 100.

The data processing device 4542 acquires data of the designated area from the controller 6, and outputs the detection result of the position of the obstacle closest to the TOF sensor 4541 out of the obstacles detected in the designated area in the visual field range by the TOF sensor 4541 to the controller 6 through the vehicle-mounted network 100.

Since the amount of information in the detection result of the TOF sensor 4541 is large, if detection data of the TOF sensor 4541 is transmitted as it is via the vehicle-mounted network 100, communication of other data may be hindered. The communication load for transmitting the detection result of the obstacle detection device 454 is reduced by the above-described processing by the data processing device 4542.

The motion sensor 454h detects a person existing in the lower center area Th0. The motion sensor 454h is, for example, an infrared sensor, an optical sensor, or the like. Note that the person existing in the lower center area Th0 is one example of the obstacle.

The plurality of cameras 46 is disposed on the upper slewing body 12 and captures images of the eight monitoring areas T0. In the present embodiment, the crane 10 includes eight cameras 46 corresponding to the eight monitoring areas T0. In the following description, the image of the monitoring area T0 captured by the camera 46 is referred to as a monitoring image. Note that one camera 46 may capture images of a plurality of monitoring areas T0.

In response to an image selection signal transmitted from the controller 6 through the vehicle-mounted network 100, the image switch 47 outputs, to the display device 7, an image signal of one of a plurality of candidate images including the monitoring images of the eight monitoring areas T0. That is, the controller 6 controls the image switch 47 to cause the display device 7 to display one of the plurality of candidate images. That is, by controlling the image switch 47, the controller 6 may cause the display device 7 to display two or more images of the plurality of candidate images.

The engine 41 is a diesel engine that drives the hydraulic pump unit 42. The pilot pressure valve 43x switches from one of the ON state (one example of allowable state) and the OFF state (one example of blocking state) to the other in response to the pilot pressure control signal supplied from the controller 6.

The pilot pressure valve 43x causes the pilot pressure to act on the hydraulic control valve 43 in the ON state, and cuts off the pilot pressure on the hydraulic control valve 43 (specifically, the slewing switching valve of the hydraulic control valve 43) in the OFF state. The pilot pressure is pressure of a pressure oil (pilot oil) output from the pilot pump of the hydraulic pump unit 42. Specifically, in the present embodiment, the pilot pressure valve 43x includes a solenoid valve capable of switching between the ON state and the OFF state by the pilot pressure control signal output from the controller 6 according to details of the manipulation on the boarding and alighting cutoff lever 511.

Two types of manipulations on the boarding and alighting cutoff lever 511 are a manipulation of instructing the pilot pressure valve 43x to switch to the OFF state, and a manipulation of instructing the pilot pressure valve 43x to switch to the ON state.

The manipulation of instructing the pilot pressure valve 43x to switch to the ON state is one example of a preparatory manipulation of instructing the slewing motor 441 to prepare for an operation. The boarding and alighting cutoff lever 511 is one example of a preparatory manipulation unit that receives the preparatory manipulation. The manipulation of instructing the pilot pressure valve 43x to switch to the OFF state is one example of a suspend manipulation.

When the pilot pressure valve 43x is in the OFF state to block the pilot pressure from acting on the hydraulic control valve 43, the hydraulic control valve 43 cannot supply the working oil to the hydraulic actuator 44 such as the slewing motor 441 even if the hydraulic control valve 43 receives, from the controller 6, the drive control signal instructing the upper slewing body 12 to slew. Specifically, when the pilot line, which is a line between the pilot pump and the one pair of electromagnetic proportional valves, is cut off by switching the pilot pressure valve 43x to the OFF state, even if the drive control signal is input from the controller 6 to one of the one pair of electromagnetic proportional valves in response to a slewing manipulation on the slewing lever 521, the pilot pressure is not supplied to the pilot port of the slewing switching valve. Therefore, when the pilot pressure valve 43x is in the OFF state, the slewing switching valve of the hydraulic control valve 43 cannot supply the working oil discharged from the main pump to the slewing motor 441. As will be described later, the hydraulic control valve 43 is controlled by a stewing control unit 63, which is a part of the controller 6.

In the present embodiment, when the pilot pressure valve 43x is in the OFF state to block the pilot pressure from acting on the hydraulic control valve 43, whereby the slewing motor 441 cannot receive the supply of the working oil, the state of the slewing motor 441 is referred to as a suspended state. When the state of the slewing motor 441 is the suspended state, the slewing motor 441 cannot be started by the control of the slewing control unit 63. That is, the suspended state is a state in which the slewing motor 441 is blocked from being started by the control of the slewing control unit 63 of the controller 6.

Meanwhile, when the pilot pressure valve 43x is in the ON state to allow the pilot pressure to act on the hydraulic control valve 43, the hydraulic control valve 43 can supply the working oil to the hydraulic actuator 44 such as the slewing motor 441 when the hydraulic control valve 43 receives, from the controller 6, the drive control signal instructing the upper slewing body 12 to slew. Specifically, in a case where the cutoff of the pilot line is released by switching the pilot pressure valve 43x to the ON state, when the drive control signal is input from the controller 6 to one of the one pair of electromagnetic proportional valves in response to the slewing manipulation on the stewing lever 521, the pilot pressure is supplied to the pilot port of the stewing switching valve. Therefore, when the pilot pressure valve 43x is in the ON state, the slewing switching valve of the hydraulic control valve 43 can supply the working oil discharged from the main pump to the slewing motor 441.

In the present embodiment, when the pilot pressure valve 43x is in the ON state to allow the pilot pressure to act on the hydraulic control valve 43, thereby allowing the slewing motor 441 to receive the supply of the working oil, the state of the slewing motor 441 is referred to as a standby state. When the state of the slewing motor 441 is the standby state, the slewing motor 441 can be started by the control of the slewing control unit 63. That is, the standby state is a state in which the slewing motor 441 can be started by the control of the slewing control unit 63 of the controller 6.

In addition, as will be described later, a main control unit 61, which is another part of the controller 6, controls the pilot pressure valve 43x in response to a manipulation on the boarding and alighting cutoff lever 511. The main control unit 61 and the pilot pressure valve 43x are one example of a state switching unit that shifts the state of the slewing motor 441 from the suspended state to the standby state in response to the preparatory manipulation. Note that a mechanical mechanism that changes the state of the pilot pressure valve 43x according to displacement of the boarding and alighting cutoff lever 511 may be adopted instead of the main control unit 61.

The hydraulic control valve 43 controls supply of the working oil to the hydraulic actuator 44 in response to the drive control signal supplied from the controller 6. However, the hydraulic control valve 43 can operate only when the pilot pressure valve 43x is in the ON state to allow the pilot pressure to act on the hydraulic control valve 43. The working oil is a pressure oil supplied from the main pump of the hydraulic pump unit 42.

The hydraulic actuators 44 include the stewing motor 441 that drives the upper stewing body 12 to rotate. The slewing motor 441 is a hydraulic motor. Furthermore, the hydraulic actuators 44 also include another hydraulic motor that drives the winch device 16. The stewing motor 441 is one example of an actuator. The upper stewing body 12 is one example of a movable part driven by the actuator.

The controller 6 starts the engine 41 by an engine starting manipulation performed on the manipulation device 5. Furthermore, the controller 6 outputs a control signal to a control target such as the hydraulic control valve 43 in response to a manipulation on the manipulation device 5 or various detection results of the state detection device 45. In addition, the controller 6 controls the display device 7.

Figure 3:
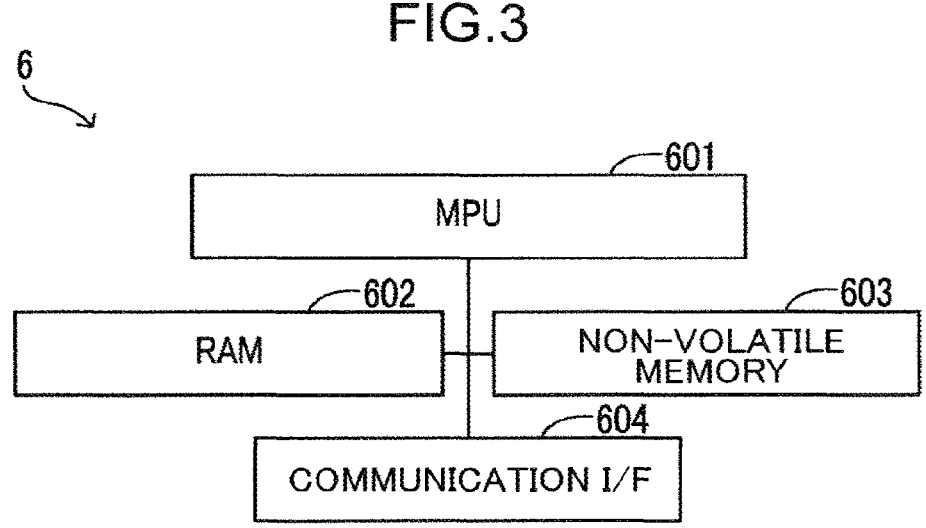
FIG. 3 is a block diagram showing a configuration of a controller in the crane according to the embodiment.

As shown in FIG. 3, the controller 6 includes a micro processing unit (MPU) 601, a random access memory (RAM) 602, a non-volatile memory 603, a communication interface 604, and the like. Note that the RAM 602 and the non-volatile memory 603 are computer-readable storage devices.

The MPU 601 is one example of a processor that executes various data processing and control by executing a program stored in the non-volatile memory 603 in advance.

The RAM 602 is a volatile memory that temporarily stores the program to be executed by the MPU 601 and data to be calculated or referenced by the MPU 601.

The non-volatile memory 603 stores in advance the program to be executed by the MPU 601 and the data to be referenced by the MPU 601. For example, it is considered that the non-volatile memory 603 is an electrically erasable programmable read only memory (EEPROM), a flash memory, or the like.

The communication interface 604 is a device that communicates with other devices such as the state detection device 45 through the vehicle-mounted network 100. The MPU 601 acquires the detection result of the state detection device 45 through the communication interface 604. Furthermore, the MPU 601 outputs the control signal to another device through the communication interface 604.

By the MPU 601 of the controller 6 executing a predetermined control program, the controller 6 operates as the main control unit 61, a state determination unit 62, the stewing control unit 63, a display control unit 64, and the like.

The main control unit 61 performs processing for acquiring the detection result of the state detection device 45 through the vehicle-mounted network 100. Furthermore, the main control unit 61 switches the pilot pressure valve 43x to the pilot pressure OFF state or the pilot pressure ON state in response to the manipulation on the boarding and alighting cutoff device 51.

The state determination unit 62 determines various states of the crane 10 based on the detection result of the state detection device 45.

The slewing control unit 63 controls the operation of the slewing motor 441 included in the hydraulic actuators 44 by controlling the hydraulic control valve 43. The slewing control unit 63 and the hydraulic control valve 43 are one example of a drive control unit that controls the operation of the actuator.

The display control unit 64 generates output screen data in response to the manipulation on the manipulation input device 54, and causes the display device 7 to display a screen according to the output screen data. Furthermore, the display control unit 64 selects the monitoring image to be displayed on the display device 7 by controlling the image switch 47.

In addition, the controller 6 also operates as a winch control unit (not shown). The winch control unit controls the hydraulic motors that drive the winch devices 16.

In that connection, when the operator is checking various states on the screen of the display device 7 in the cab 13 at a work site, the operator may perform various preparatory work around the upper slewing body 12 of the crane 10.

In the above-described case, if the monitoring image corresponding to the monitoring area T0 in which the worker is detected is automatically displayed on the display device 7 every time the obstacle detection device 454 detects the worker, the operation of checking information on the screen of the display device 7 by the operator may be hindered.

Meanwhile, if a function of automatic control of display of the monitoring image in response to the detection of the obstacle is stopped in response to the manipulation by the operator, the operator may forget to perform the manipulation of releasing stop of the automatic control function of display of the monitoring image after the checking work.

In the crane 10, the controller 6 executes first monitoring control and second monitoring control to be described later. By the control, unnecessary, automatic switching of display contents of the display device 7 is avoided even if the operator does not stop the function of automatic control of display of the monitoring image.

[First Monitoring Control]

Hereinafter, one example of a procedure for the first monitoring control will be described with reference to the flowchart shown in FIG. 6.

The main control unit 61 of the controller 6 starts the first monitoring control when the engine 41 starts. When the engine 41 starts, the state of the slewing motor 441 is the suspended state, and each of the hydraulic actuators 44 including the slewing motor 441 is at a stop.

The first monitoring control is executed under circumstances where each of the hydraulic actuators 44 including the stewing motor 441 is at a stop. In the following description, symbols such as S101 and S102 represent identification symbols for a plurality of processes in the first monitoring control.

<Process S101>

Figure 9:
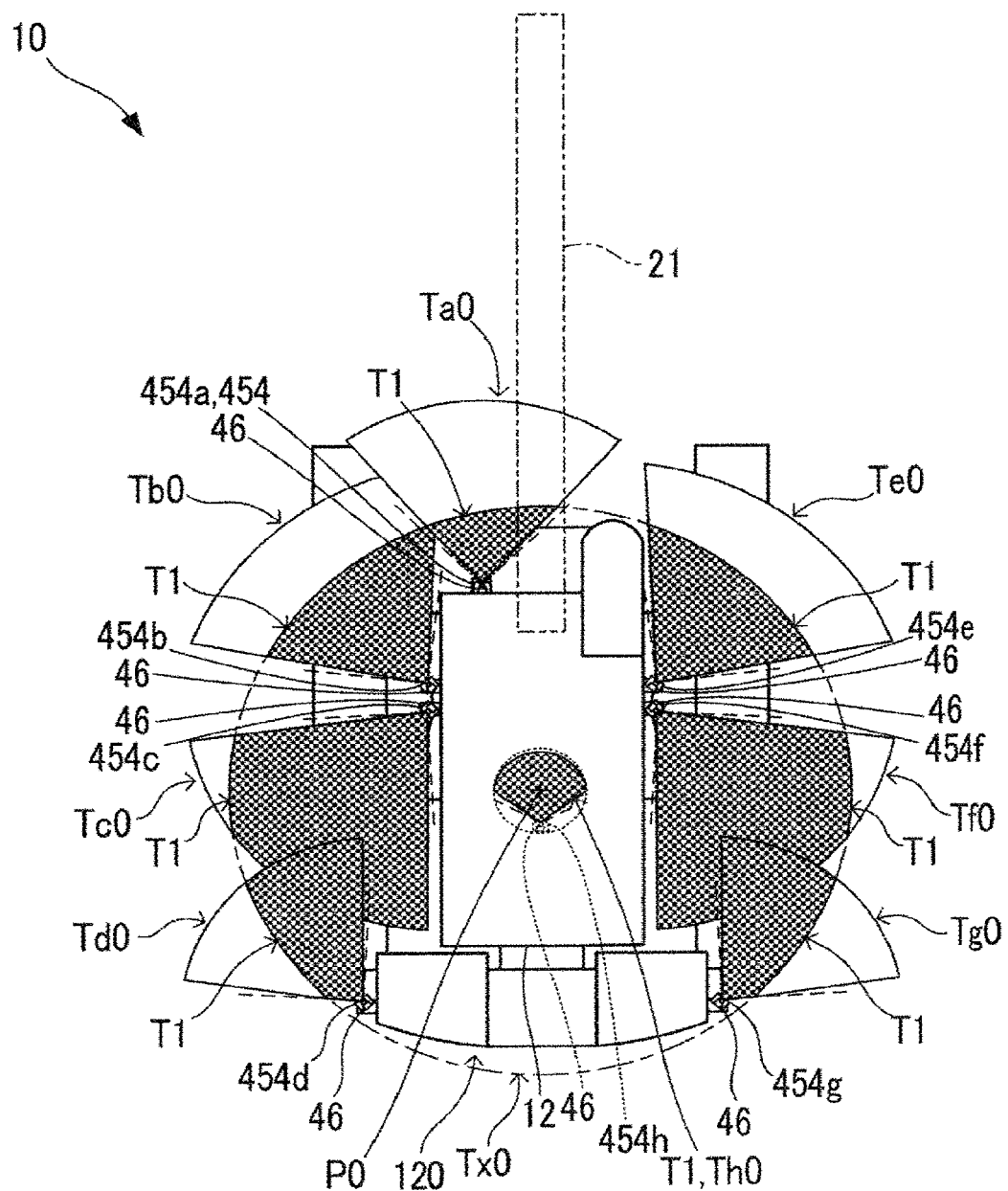
FIG. 9 is a plan view showing a first monitoring area in the crane according to the embodiment.

In the first monitoring control, to begin with, for each of the TOF sensor units 454a to 454g of the obstacle detection device 454, the slewing control unit 63 sets first monitoring areas T1 that are set in advance with respect to the upper slewing body 12 as the designated area (see FIG. 9).

In the present embodiment, by the processing of process S101, seven first monitoring areas T1, which are areas including inner portions of the seven monitoring areas T0 (the outer peripheral monitoring areas), are set as the designated area. Furthermore, the stewing control unit 63 also treats the lower center area Th0 as the first monitoring area T1.

The eight first monitoring areas T1 are areas inside a circular range Tx0 set in advance with respect to the upper slewing body 12 out of the eight monitoring areas T0. This circular range Tx0 is set to overlap at least part of the eight monitoring areas T0 in plan view. In the example shown in FIGS. 9 and 10, the circular range Tx0 is a range represented by a circle having a radius determined in advance centered on a slewing center P0 of the upper slewing body 12.

The circular range Tx0 is a range where the upper stewing body 12 passes when the upper slewing body 12 slews. That is, the first monitoring areas T1 are areas for detecting the obstacle that is likely to come into contact with the upper slewing body 12 when the upper stewing body 12 slews.

In the present embodiment, the three monitoring areas T0 of the front area Ta0, the front and left area Tb0, and the rear and right area Tg0 are associated in advance with the left slewing direction of the upper slewing body 12. The three first monitoring areas T1 in these three monitoring areas T0 are areas in which extra caution needs to be exercised about a collision accident between the upper slewing body 12 and the obstacle when the upper stewing body 12 slews in the left slewing direction.

Similarly, the two monitoring areas T0 of the rear and left area Td0 and the front and right area Te0 are associated in advance with the right slewing direction of the upper slewing body 12. The two first monitoring areas T1 in these two monitoring areas T0 are areas in which extra caution needs to be exercised about a collision accident between the upper slewing body 12 and the obstacle when the upper slewing body 12 slews in the right slewing direction.

In the present embodiment, the obstacle detection device 454 can detect the obstacle individually in five first monitoring areas T1 corresponding to the two slewing directions of the upper slewing body 12. Note that the right slewing direction and the left slewing direction are two slewing directions of the upper slewing body 12.

By the processing of process S101 being performed, in each of the TOF sensor units 454a to 454g, the data processing device 4542 acquires data representing the first monitoring area T1 from the controller 6 as data of the designated area. Furthermore, the data processing device 4542 outputs, to the controller 6, the detection result of the position of the obstacle closest to the TOF sensor 4541 out of the obstacles detected in the first monitoring area T1 in the visual field range by the TOF sensor 4541.

Note that the motion sensor 454h outputs the detection result of a person in the lower center area Th0 to the controller 6 regardless of setting of the designated area.
<Process S102>

Next, the state determination unit 62 acquires the detection result of the obstacle detection device 454 and determines whether the obstacle is detected in each of the eight first monitoring areas T1.

Then, on determination that the obstacle is detected in at least one first monitoring area T1 out of the eight first monitoring areas T1, the state determination unit 62 shifts the processing to process S103. Meanwhile, on determination that the obstacle is not detected in any of the eight first monitoring areas T1, the state determination unit 62 shifts the processing to process S109.

In process S102, when part of the plurality of monitoring areas T0 is set as an invalid area by the invalid area setting processing described later, the state determination unit 62 determines whether the obstacle is detected without taking into consideration the detection result of the obstacle in the invalid area.
<Process S103>

In process S103, the slewing control unit 63 sets a slewing interlock flag to ON and shifts the processing to process S104. The stewing interlock flag is a flag indicating whether to prohibit or allow the start of the slewing motor 441.

When the slewing motor 441 is at a stop and the slewing manipulation device 52 receives the slewing manipulation on the slewing lever 521, the slewing control unit 63 starts the slewing motor 441 only when the stewing interlock flag is OFF. That is, the slewing interlock flag being ON means that the start of the slewing motor 441 is prohibited, and the slewing interlock flag being OFF means that the slewing motor 441 is allowed to start.

The processing of process S103 for setting the slewing interlock flag to ON is one example of slewing interlock processing for prohibiting the start of the slewing motor 441.
<Process S104>

In process S104, the state determination unit 62 determines whether the state of the slewing motor 441 is the standby state or the suspended state.

Then, on determination that the state of the slewing motor 441 is the standby state, the state determination unit 62 shifts the processing to process S105, and on determination that the state of the stewing motor 441 is the suspended state, the state determination unit 62 shifts the processing to process S112.
<Process S105>

In process S105, the state determination unit 62 determines whether the position of the slewing lever 521 is the neutral position. Then, on determination that the position of the slewing lever 521 is the neutral position, the state determination unit 62 shifts the processing to process S106. Meanwhile, on determination that the position of the slewing lever 521 is not the neutral position, the state determination unit 62 shifts the processing to process S107.
<Process S106>

In process S106, the display control unit 64 executes first automatic image output and then shifts the processing to process S108.

The first automatic image output is processing for automatically causing the display device 7 to display the monitoring image corresponding to the first monitoring area T1 in which the obstacle is detected in response to the detection of the obstacle in the first monitoring area T1 by the obstacle detection device 454.

The display control unit 64 performs the processing of process S106 when the slewing interlock processing prohibits the start of the slewing motor 441 and the stewing manipulation on the slewing lever 521 is not performed.

In process S106, when the obstacle is detected in each of two or more first monitoring areas T1 out of the plurality of first monitoring areas T1, the display control unit 64 causes the display device 7 to display the monitoring image corresponding to the obstacle detected at a position closest to the position of the slewing center P0 of the upper slewing body 12 out of the obstacles detected in the two or more first monitoring areas T1. The position of the slewing center P0 is one example of a predetermined reference position in the upper slewing body 12.

For example, the data processing device 4542 of each of the TOF sensor units 454a to 454g may be configured to convert primary coordinate data representing the position of the obstacle with respect to the position of the TOF sensor 4541 into secondary coordinate data with respect to the position of the stewing center P0 and to transmit the secondary coordinate data to the controller 6.

In addition, the data processing device 4542 may be configured to transmit the primary coordinate data to the controller 6, and the main control unit 61 may be configured to convert the primary coordinate data into the secondary coordinate data.

The display control unit 64 calculates the distance from the position of the stewing center P0 to each obstacle based on the secondary coordinate data.

By the processing of process S106, the presence of the nearest obstacle that is likely to come into contact with the upper slewing body 12 if the upper slewing body 12 slews is promptly notified to the operator by the display of the monitoring image.

<Process S107>

In process S107, the display control unit 64 executes the first automatic image output in a similar manner to process S106, and then shifts the processing to process S108.

In a case where the stewing interlock processing prohibits the start of the slewing motor 441, the display control unit 64 performs the processing of process S107 of FIG. 6 when the slewing manipulation of instructing the slewing lever 521 to drive the upper slewing body 12 is performed. The slewing manipulation is one example of the drive manipulation of instructing the actuator to operate.

In process S107, under circumstances where the obstacle is detected in each of two or more first monitoring areas T1 out of the plurality of first monitoring areas T1, out of the two or more first monitoring areas T1, the display control unit 64 causes the display device 7 to display the monitoring image of the first monitoring area T1 corresponding to the instruction direction of slewing the upper slewing body 12 by the slewing manipulation in preference to other monitoring images.

For example, when the instruction direction is a left stewing direction, the display control unit 64 causes the display device 7 to display the monitoring images of the three monitoring areas T0 of the front area Ta0, the front and left area Tb0, and the rear and right area Tg0 in preference to other monitoring images.

Similarly, when the instruction direction is a right slewing direction, the display control unit 64 causes the display device 7 to display the monitoring images of the two monitoring areas T0 of the rear and left area Td0 and the front and right area Te0 in preference to other monitoring images.

By the processing of process S107, the presence of the obstacle that is likely to come into contact with the upper slewing body 12 if the upper slewing body 12 stews in the slewing direction according to the intention of the operator is promptly notified to the operator by the display of the monitoring image.

Note that when the obstacle is detected in each of the plurality of first monitoring areas T1 corresponding to the instruction direction, out of the plurality of obstacles detected in the plurality of first monitoring areas T1 corresponding to the instruction direction, the display control unit 64 causes the display device 7 to preferentially display the monitoring image corresponding to the obstacle detected at the position closest to the position of the slewing center P0 of the upper slewing body 12.

<Process S108>

In process S108, the display control unit 64 outputs a predetermined alarm corresponding to the detection of the obstacle through the display device 7 and a buzzer (not shown), and then shifts the processing to process S102. With this operation, the processing after process S102 is repeated with the first monitoring areas T1 still set as the designated area.

Note that the crane 10 may include a plurality of alarm devices (not shown) located in monitoring areas T0 respectively. In this case, in process S108, the main control unit 61 may be configured to perform danger notification processing through the alarm device corresponding to the monitoring area T0 in which the obstacle is detected. For example, one or both of a speaker that outputs a danger notification sound and an alarm light that emits danger notification light are adopted as the alarm devices.

<Process S109>

In process S109, the state determination unit 62 starts a timer that measures elapsed time from determination that the obstacle is not detected in any of the plurality of first monitoring areas T1. Thereafter, the state determination unit 62 shifts the processing to process S110.

<Process S110>

In process S110, the state determination unit 62 determines whether the state of the slewing motor 441 is the standby state or the suspended state.

Then, on determination that the state of the slewing motor 441 is the standby state, the state determination unit 62 shifts the processing to process S111, and on determination that the state of the slewing motor 441 is the suspended state, the state determination unit 62 shifts the processing to process S112.

<Process S111>

In process S111, the state determination unit 62 determines whether the slewing brake device 440 is in the brake ON state or the brake OFF state.

Then, on determination that the slewing brake device 440 is in the brake ON state, the state determination unit 62 shifts the processing to process S112, and on determination that the slewing brake device 440 is in the brake OFF state, the state determination unit 62 shifts the processing to process S113.

<Process S112>

In process S112, the display control unit 64 returns the image to be displayed on the display device 7 to the original image, and then shifts the processing to process S102. With this operation, the processing after process S102 is repeated with the first monitoring areas T1 still set as the designated area.

The original image is a image that has been displayed on the display device 7 before the display control unit 64 automatically causes the display device 7 to display the monitoring image in response to the detection of the obstacle.

Note that before the monitoring image is automatically displayed on the display device 7 in response to the detection of the obstacle, the display state of the image of the display device 7 at that time is maintained as it is.

<Process S113>

In process S113, the slewing control unit 63 starts the second monitoring control described below. When the second monitoring control is finished, the slewing control unit 63 shifts the processing to process S101. With this operation, the first monitoring areas T1 are set again as the designated area (S101), and then the processing after process S102 is repeated.

As described above, at least when the obstacle is detected in the first monitoring area T1 under circumstances where the slewing motor 441 is at a stop, the slewing control unit 63 performs the slewing interlock processing for prohibiting the start of the slewing motor 441 (see processes S101 to S103 of FIG. 6).

By the slewing interlock processing, it is possible to avoid slewing of the upper slewing body 12 under circumstances where the worker exists in the first monitoring area T1 near the upper slewing body 12.

[Second Monitoring Control]

Next, one example of a procedure for the second monitoring control will be described with reference to the flowchart shown in FIG. 7.

The second monitoring control is started when the state of the slewing motor 441 is the standby state and the slewing brake device 440 is in the brake OFF state under circumstances where each of the hydraulic actuators 44 including the slewing motor 441 is at a stop. In the following description, symbols such as S201 and S202 represent identification symbols for a plurality of processes in the second monitoring control.

<Process S201>

In the second monitoring control, to begin with, for each of the TOF sensor units 454a to 454g of the obstacle detection device 454, the slewing control unit 63 sets second monitoring areas T2 that are set in advance at places remoter from the upper slewing body 12 than the first monitoring areas T1 as the designated area (see FIG. 10).

In the present embodiment, by the processing of process S201, a remaining part of the seven monitoring areas T0 (the outer peripheral monitoring areas) excluding the seven first monitoring areas T1, that is, the seven second monitoring areas T2, which are areas including outer portions of the seven monitoring areas T0, are set as the designated area. These seven second monitoring areas T2 are areas corresponding to the seven TOF sensor units 454a to 454g.

The seven second monitoring areas T2 are areas outside the circular range Tx0 set with respect to the upper slewing body 12 out of the eight monitoring areas T0.

By the processing of process S201 being performed, in each of the TOF sensor units 454a to 454g, the data processing device 4542 acquires data representing the second monitoring areas T2 from the controller 6 as data of the designated area. Furthermore, the data processing device 4542 outputs, to the controller 6, the detection result of the position of the obstacle closest to the TOF sensor 4541 out of the obstacles detected in the second monitoring areas T2 in the visual field range by the TOF sensor 4541.

In the second monitoring control, the processing corresponding to the detection of the obstacle by the motion sensor 454h is not particularly performed.

<Process S202>

Next, the state determination unit 62 acquires the detection result of the obstacle detection device 454 and determines whether the obstacle is detected in each of the seven second monitoring areas T2.

Then, on determination that the obstacle is detected in at least one second monitoring area T2 out of the seven second monitoring areas T2, the state determination unit 62 shifts the processing to process S203. Meanwhile, on determination that the obstacle is not detected in any of the seven second monitoring areas T2, the state determination unit 62 shifts the processing to process S206.

In process S202, when part of the plurality of monitoring areas T0 is set as an invalid area by the invalid area setting processing described above, the state determination unit 62 determines whether the obstacle is detected without taking into consideration the detection result of the obstacle in the invalid area. The invalid area setting processing will be described later.

<Process S203>

In process S203, the display control unit 64 executes second automatic image output and then shifts the processing to process S204.

The second automatic image output is processing for automatically causing the display device 7 to display the monitoring image corresponding to the second monitoring area T2 in which the obstacle is detected in response to the detection of the obstacle in the second monitoring area T2 by the obstacle detection device 454.

In process S203, when the obstacle is detected in each of two or more second monitoring areas T2 out of the plurality of second monitoring areas T2, the display control unit 64 causes the display device 7 to display the monitoring image corresponding to the obstacle detected at a position closest to the position of the slewing center P0 of the upper slewing body 12 out of the obstacles detected in the two or more second monitoring areas T2.

By the processing of process S203, the presence of the obstacle that may enter the first monitoring area T1 from the second monitoring area T2 is promptly notified to the operator by the display of the monitoring image.

<Process S204>

In process S204, the slewing control unit 63 sets operation limitation of the slewing motor 441 and shifts the processing to process S205. The operation limitation setting is processing for limiting the operation of the slewing motor 441 in response to the manipulation of slewing instruction on the slewing manipulation device 52 (the slewing manipulation) after the start of the stewing motor 441 is allowed. The operation limitation is a limitation other than prohibition of starting the slewing motor 441.

For example, in process S204, the slewing control unit 63 may be configured to set the operation limitation by performing speed limiting processing, which is processing for limiting a rotation speed of the slewing motor 441. Specifically, the slewing control unit 63 sets the operation limitation by setting a speed limit flag to ON in the speed limiting processing. When the speed limit flag is set to ON, the slewing control unit 63 operates the stewing motor 441 in response to a manipulation of a stewing instruction (the slewing manipulation) on the slewing manipulation device 52 within a range that does not exceed the predetermined speed limit.

Note that the limitation of the rotation speed of the slewing motor 441 may be directly implemented by feedback of a measured value of the operating speed of the stewing motor 441 or the upper slewing body 12. In addition, the limitation of the rotation speed of the stewing motor 441 may be indirectly implemented by limiting the opening degree of the hydraulic control valve 43 corresponding to the slewing motor 441 or limiting the hydraulic pressure acting on the slewing motor 441.

In addition, the slewing control unit 63 may be configured to set the operation limitation by performing direction limiting processing in process S204. The direction limiting processing is processing for prohibiting the operation of the slewing motor 441 that stews the upper slewing body 12 in the slewing direction corresponding to the second monitoring area T2 in which the obstacle is detected, while for allowing the operation of the slewing motor 441 that slews the upper stewing body 12 in the slewing direction corresponding to the second monitoring area T2 in which the obstacle is not detected. Specifically, the control is as follows.

As described above, out of the eight monitoring areas T0, the three monitoring areas T0 of the front area Ta0, the front and left area Tb0, and the rear and right area Tg0 are associated in advance with the left slewing direction, which is one of the two slewing directions of the upper slewing body 12, and the two monitoring areas T0 of the rear and left area Td0 and the front and right area Te0 are associated in advance with the right slewing direction, which is the other of the two slewing directions. Therefore, the three second monitoring areas T2 corresponding to the three monitoring areas T0 are set to correspond to the left slewing direction, and the two second monitoring areas T2 corresponding to the two monitoring areas T0 are set to correspond to the right stewing direction. For example, when the obstacle is detected in at least one of the three second monitoring areas T2 and the obstacle is not detected in either of the two second monitoring areas T2, the slewing control unit 63 prohibits the operation of the slewing motor 441 that slews the upper slewing body 12 in the left slewing direction, while allows the operation of the slewing motor 441 that slews the upper slewing body 12 in the right slewing direction.

Furthermore, the stewing control unit 63 may perform both the speed limiting processing and the direction limiting processing. In this case, the slewing control unit 63 limits the rotation speed of the slewing motor 441 when the upper stewing body 12 is slewed in the allowed slewing direction.

<Process S205>

In process S205, the display control unit 64 outputs a predetermined alarm corresponding to the detection of the obstacle through the display device 7 and a buzzer (not shown), and then shifts the processing to process S208.

Note that when the crane 10 includes the plurality of alarm devices (for example, the speaker, the alarm light, and the like), in process S205, the main control unit 61 may be configured to perform the danger notification processing through the alarm device corresponding to the monitoring area T0 in which the obstacle is detected out of the plurality of alarm devices.

<Process S206>

Meanwhile, in process S206, in a similar manner to process S112, the display control unit 64 returns the image to be displayed on the display device 7 to the original image, and then shifts the processing to process S207.

Note that before the monitoring image is automatically displayed on the display device 7 in response to the detection of the obstacle, the display state of the image of the display device 7 at that time is maintained as it is.

<Process S207>

In process S207, the slewing control unit 63 releases the operation limitation of the slewing motor 441 and shifts the processing to process S208.

<Process S208>

In process S208, the state determination unit 62 determines whether the stewing lever 521 exists at the neutral position.

Then, on determination that the slewing lever 521 exists at the neutral position, the state determination unit 62 shifts the processing to process S209. Meanwhile, on determination that the slewing lever 521 does not exist at the neutral position, the state determination unit 62 shifts the processing to process S212.

<Process S209>

In process S209, the slewing control unit 63 sets the stewing interlock flag to OFF and shifts the processing to process S210.

When the slewing manipulation device 52 receives the slewing manipulation on the slewing lever 521 under circumstances where the slewing motor 441 is at a stop and the slewing interlock flag is OFF, the slewing control unit 63 starts the slewing motor 441.

<Process S210>

In process S210, the state determination unit 62 determines whether the stewing motor 441 is at a stop. Then, on determination that the stewing motor 441 is at a stop, the state determination unit 62 shifts the processing to process S211. Meanwhile, on determination that the stewing motor 441 is not at a stop, the state determination unit 62 shifts the processing to process S213.

<Process S211>

In process S211, the state determination unit 62 determines whether a predetermined allowed time has elapsed from determination that the obstacle is not detected in any of the plurality of first monitoring areas T1.

On determination that the allowed time has elapsed, the state determination unit 62 finishes the second monitoring control. With this operation, the first monitoring control shown in FIG. 6 is executed again.

Meanwhile, on determination that the allowed time has not elapsed, the state determination unit 62 shifts the processing to process S202. With this operation, the processing after process S202 is repeated with the second monitoring areas T2 still set as the designated area.

<Process S212>

In process S212, the display control unit 64 outputs a neutral notification, which is a notification for prompting the operator to return the stewing lever 521 to the neutral position, through the display device 7 and the buzzer (not shown), and shifts the processing to process S202.

The processing of processes S208, S209, and S212 is, for the slewing motor 441, processing for preventing the slewing motor 441 from suddenly starting at a timing delayed from the manipulation of the slewing lever 521 by the release of the interlock.

<Process S213>

The processing of process S213 is performed after the stewing motor 441 starts. In process S213, the state determination unit 62 stands by while determining whether a predetermined resumption condition is satisfied.

The resumption condition is a condition for resuming the first monitoring control after the slewing motor 441 starts, and includes as an essential condition that the stewing motor 441 has stopped. For example, the resumption condition may include a brake ON condition in which the stewing motor 441 has stopped and the stewing brake device 440 has changed to the brake ON state.

In addition, the resumption condition may include a stop continuation condition that the state in which the slewing motor 441 has stopped continues for a predetermined time. The resumption condition may include at least one of the brake ON condition and the stop continuation condition.

In addition, the resumption condition may include a suspend shift condition in which the state of the slewing motor 441 has shifted from the standby state to the suspended state. The resumption condition may include at least one of the brake ON condition, the stop continuation condition, and the suspend shift condition.

Then, on determination that the resumption condition is satisfied, the state determination unit 62 shifts the processing to process S214.

<Process S214>

In process S214, the stewing control unit 63 releases the operation limitation of the stewing motor 441 and finishes the second monitoring control. With this operation, the first monitoring control shown in FIG. 6 is executed again.

Figure 7:
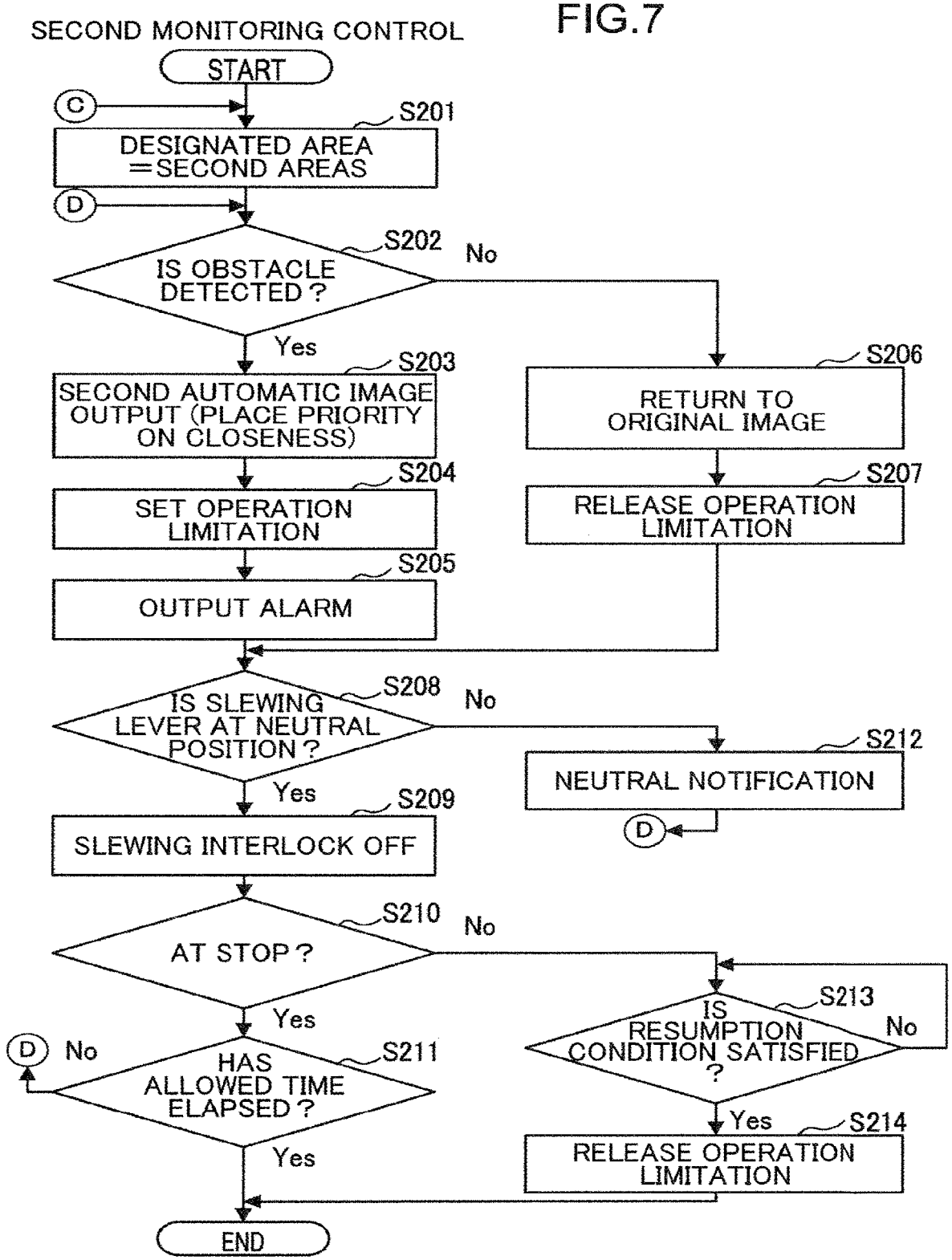
FIG. 7 is a flowchart showing one example of a procedure for second monitoring control the crane according to the embodiment.

As described above, when the stewing motor 441 is at a stop, the stewing control unit 63 of the controller 6 sets one or more first monitoring areas T1 set with respect to the upper stewing body 12 as the designated area, and then controls, depending on whether the obstacle is detected in the one or more first monitoring areas T1, whether to prohibit or allow the start of the stewing motor 441 in response to the stewing manipulation on the stewing lever 521 (see processes S101 to S103 of FIG. 6 and process S209 of FIG. 7). The stewing control unit 63 that executes this control is one example of a first stewing control unit.

Furthermore, the stewing control unit 63 sets one or more second monitoring areas T2 that are set at places remoter from the upper stewing body 12 than the first monitoring areas T1 as the designated area, and then controls, depending on whether the obstacle is detected in the one or more second monitoring areas T2, whether to limit the operation of the stewing motor 441 in response to the stewing manipulation on the stewing lever 521 after the start of the stewing motor 441 is allowed (processes S201, S202, S204, S207, and S209 of FIG. 7). The stewing control unit 63 that executes this control is one example of a second stewing control unit. That is, the stewing control unit 63 includes the first stewing control unit and the second stewing control unit.

That is, in order to achieve both safety and work efficiency, the stewing control unit 63 of the controller 6 individually takes measures in response to the detection of the obstacle in each of the first monitoring areas T1 near the upper stewing body 12 and the second monitoring areas T2 thereararound.

Specifically, safety check is sufficiently performed in the first monitoring areas T1 around the upper stewing body 12 by the first monitoring control of the stewing control unit 63 before the upper stewing body 12 starts.

Furthermore, even in a case where the obstacle exists n the monitoring area T0, the start of the upper stewing body 12 is not prohibited by the second monitoring control of the stewing control unit 63 even when the obstacle exists in the second monitoring area T2 in which the obstacle does not come into contact with the upper slewing body 12. Therefore, deterioration of the work efficiency of the crane 10 is avoided.

However, when the obstacle exists in the second monitoring area T2 in which the obstacle does not come into contact with the upper stewing body 12, the hoist load 9 or the boom 21 that supports the hoisting rope 32 may come into contact with the obstacle. In this case, the stewing control unit 63 limits the operation of the stewing motor 441 as a measure different from the prohibition of start of the upper stewing body 12 in the second monitoring control (see process S204 of FIG. 7). With this operation, safety is ensured while a decrease in the work efficiency is avoided.

In addition, each of the TOF sensor units 454a to 454g detects the obstacle individually in the first monitoring area T1 and the second monitoring area T2 by changing the setting of the designated area. With this operation, the crane 10 can take appropriate measures in response to the detection of the obstacle in each of the first monitoring area T1 and the second monitoring area T2 thereararound by using as few TOF sensors 4541 as possible.

In addition, when the slewing motor 441 starts with the operation of the slewing motor 441 limited, the stewing control unit 63 releases the limitation on the operation of the slewing motor 441 on condition that the slewing motor 441 stops after the slewing motor 441 starts (see processes S213 and S214 of FIG. 7). Therefore, acceleration of the upper slewing body 12 against the intention of the operator is avoided.

The slewing control unit 63 that performs processing of processes S213 and S214 is one example of the second stewing control unit. Note that in the example shown in FIG. 7, the resumption condition also serves as a condition for releasing the limitation on the operation of the slewing motor 441. However, the condition for releasing the limitation on the operation of the slewing motor 441 may be determined separately from the resumption condition.

In addition, on determination that the state of the slewing motor 441 is the standby state, the display control unit 64 executes the first automatic image output or the second automatic image output that is processing for automatically causing the display device 7 to display the monitoring image corresponding to the monitoring area T0 in which the obstacle is detected (see processes S104 to S107, S110, and S113 of FIG. 6 and processes S202 and S203 of FIG. 7). These processes are one example of the second process of causing the display device 7 to selectively display one monitoring image out of the plurality of monitoring images of the plurality of monitoring areas according to the determination result of the state of the actuator. The display control unit 64 causes the display device 7 to selectively display one monitoring image out of the plurality of monitoring images of the plurality of monitoring areas according to the determination result of the state of the actuator. However, this second process may cause the display device 7 to selectively display two or more monitoring images out of the plurality of monitoring images of the plurality of monitoring areas according to the determination result of the state of the actuator. That is, the display control unit 64 may cause the display device 7 to selectively display two or more monitoring images out of the plurality of monitoring images of the plurality of monitoring areas according to the determination result of the state of the actuator.

Meanwhile, on determination that the state of the stewing motor 441 is the suspended state, the display control unit 64 does not perform the first automatic image output and the second automatic image output (see processes S104, S110, and S112 of FIG. 6). These processes are one example of the second process.

Generally, under circumstances where the state of the slewing motor 441 is maintained in the suspended state, the worker performs various preparatory work around the upper slewing body 12 of the crane 10.

Therefore, in the crane 10, when the preparatory work is performed, the monitoring image is not automatically displayed on the display device 7 every time the obstacle detection device 454 detects the worker. Therefore, the work of checking information on the screen of the display device 7 by the operator is not hindered. That is, unnecessary, automatic switching of display contents of the display device 7 is avoided even if the operator does not stop functions of automatic control of image display.

Meanwhile, when the state of the slewing motor 441 is the standby state, the first automatic image output or the second automatic image output is executed in response to the detection of the obstacle without the need for the switching manipulation of the image control by the operator.

In addition, when the slewing motor 441 is at a stop and the slewing brake device 440 is in the brake ON state, the display control unit 64 executes the first automatic image output (see processes S111, S102, S106, and S107 of FIG.

6). The first automatic image output is automatic image output in response to the detection of the obstacle in the first monitoring area T1.

Meanwhile, when the slewing motor 441 is at a stop and the slewing brake device 440 is in the brake OFF state under circumstances where the start of the slewing motor 441 is not prohibited, the display control unit 64 executes the second automatic image output without executing the first automatic image output (see processes S209, S210, S211, S202, and S203 of FIG. 7). The second automatic image output is automatic image output in response to the detection of the obstacle in the second monitoring area T2.

Generally, when the operator finishes checking the situation around the upper slewing body 12 and then determines to start slewing the upper slewing body 12, the operator performs a manipulation of switching the slewing brake device 440 from the brake ON state to the brake OFF state.

Therefore, when the operator is checking the situation around the upper stewing body 12, the display control unit 64 appropriately assists the safety checking work of the operator by executing the first automatic image output.

Meanwhile, from the time when the operator determines to start slewing the upper slewing body 12 until the slewing of the upper slewing body 12 starts, the display control unit 64 executes the second automatic image output. With this operation, the display control unit 64 appropriately assists the safety checking work of the second monitoring area T2 to be performed next by the operator without requiring the switching manipulation by the operator.

[Invalid Area Setting Processing]

As shown in FIG. 2, the controller 6 may further include an invalid area setting unit 65. In this case, the MPU 601 of the controller 6 executes a predetermined program, whereby the invalid area setting unit 65 of the controller 6 performs invalid area setting processing.

Hereinafter, with reference to the flowchart shown in FIG. 8, one example of the procedure for the invalid area setting processing performed by the invalid area setting unit 65 will be described.

The invalid area setting processing is processing for setting an area where it is determined that the obstacle is not detected regardless of the detection result of the obstacle detection device 454.

The invalid area setting unit 65 performs the invalid area setting processing when the engine 41 is operating and the slewing motor 441 is at a stop. In the following description, symbols such as S301 and S302 represent identification symbols for a plurality of processes in the invalid area setting processing.

<Process S301>

In the invalid area setting processing, the invalid area setting unit 65 determines whether the display device 7 is displaying a notable image, which is the monitoring image of the monitoring area T0 in which the obstacle is detected.

Then, on determination that the display device 7 is displaying the notable image, the invalid area setting unit 65 shifts the processing to process S302. Meanwhile, on determination that the display device 7 is not displaying the notable image, the invalid area setting unit 65 shifts the processing to process S304.

<Process S302>

In process S302, under circumstances where the notable image is displayed on the display device 7, the invalid area setting unit 65 determines whether a predetermined invalid setting manipulation on the manipulation input device 54 is detected.

Then, when the invalid setting manipulation on the manipulation input device 54 is detected, the invalid area setting unit 65 shifts the processing to process S303, and when the invalid setting manipulation is not detected, the invalid area setting unit 65 shifts the processing to process S304.

<Process S303>

In process S303, the invalid area setting unit 65 sets the invalid area including the position of the obstacle detected in the monitoring area T0 corresponding to the notable image. Thereafter, the invalid area setting unit 65 shifts the processing to process S301.

For example, the invalid area setting unit 65 may be configured to set an area of a part of a range of a predetermined distance from the position of the obstacle or the entire range as the invalid area in the first monitoring area T1 or the second monitoring area T2 corresponding to the notable image.

In addition, the invalid area setting unit 65 may be configured to set the entire first monitoring area T1 or second monitoring area T2 corresponding to the notable image as the invalid area.

As described above, the invalid area is excluded from a target of determining whether the obstacle is detected (see process S102 of FIG. 6 and process S202 of FIG. 7).

Therefore, when the invalid area is set, the slewing control unit 63 does not prohibit the start of the slewing motor 441 or limit the operation of the slewing motor 441 in response to the detection of the obstacle in the invalid area. That is, the slewing control unit 63 is configured not to execute control for prohibiting the start of the slewing motor 441 in response to the detection of the obstacle in the invalid area when the invalid area is set, and is configured not to execute control for limiting the operation of the slewing motor in response to the detection of the obstacle in the invalid area.

Similarly, when the invalid area is set, the display control unit 64 does not execute the first automatic image output or the second automatic image output in response to the detection of the obstacle in the invalid area. That is, the display control unit 64 is configured not to execute the first automatic image output or the second automatic image output in response to the detection of the obstacle in the invalid area when the invalid area is set.

<Process S304>

In process S304, the invalid area setting unit 65 determines whether a predetermined invalidation release condition is satisfied. Then, on determination that the invalidation release condition is satisfied, the invalid area setting unit 65 shifts the processing to process S305. Meanwhile, on determination that the invalidation release condition is not satisfied, the invalid area setting unit 65 repeats the processing from process S301.

The invalidation release condition is a condition for releasing the setting of the invalid area. For example, the invalidation release condition may be the same condition as the suspend shift condition in the resumption condition. In addition, the invalidation release condition may include at least one of the brake ON condition and the suspend shift condition in the resumption condition.

<Process S305>

In process S305, the invalid area setting unit 65 releases the setting of the invalid area, and then repeats the processing from process S301.

As described above, the invalid area setting unit 65 performs the processing of process S302 and process S303 under circumstances where the obstacle is detected in the first monitoring area T1 or the second monitoring area T2 when the slewing motor 441 is at a stop, and the notable image, which is the monitoring image of the area where the obstacle is detected, is displayed on the display device 7.

The obstacle detected in the first monitoring area T1 or the second monitoring area T2 is the obstacle detected in one of the designated areas on the TOF sensor units 454a to 454g or in the lower center area Th0.

In process S302 and process S303, when the predetermined invalid setting manipulation is detected, the invalid area setting unit 65 sets the invalid area including the position of the obstacle detected in the first monitoring area T1 or the second monitoring area T2 corresponding to the notable image displayed on the display device 7.

Therefore, when a thing that does not cause any particular problem in operating the crane 10 is detected as the obstacle, it is possible to avoid deterioration of the work efficiency of the crane 10 by setting the invalid area.

In addition, since the invalid area can be set only when the operator can check the image, safety is also ensured.

Figure 8:
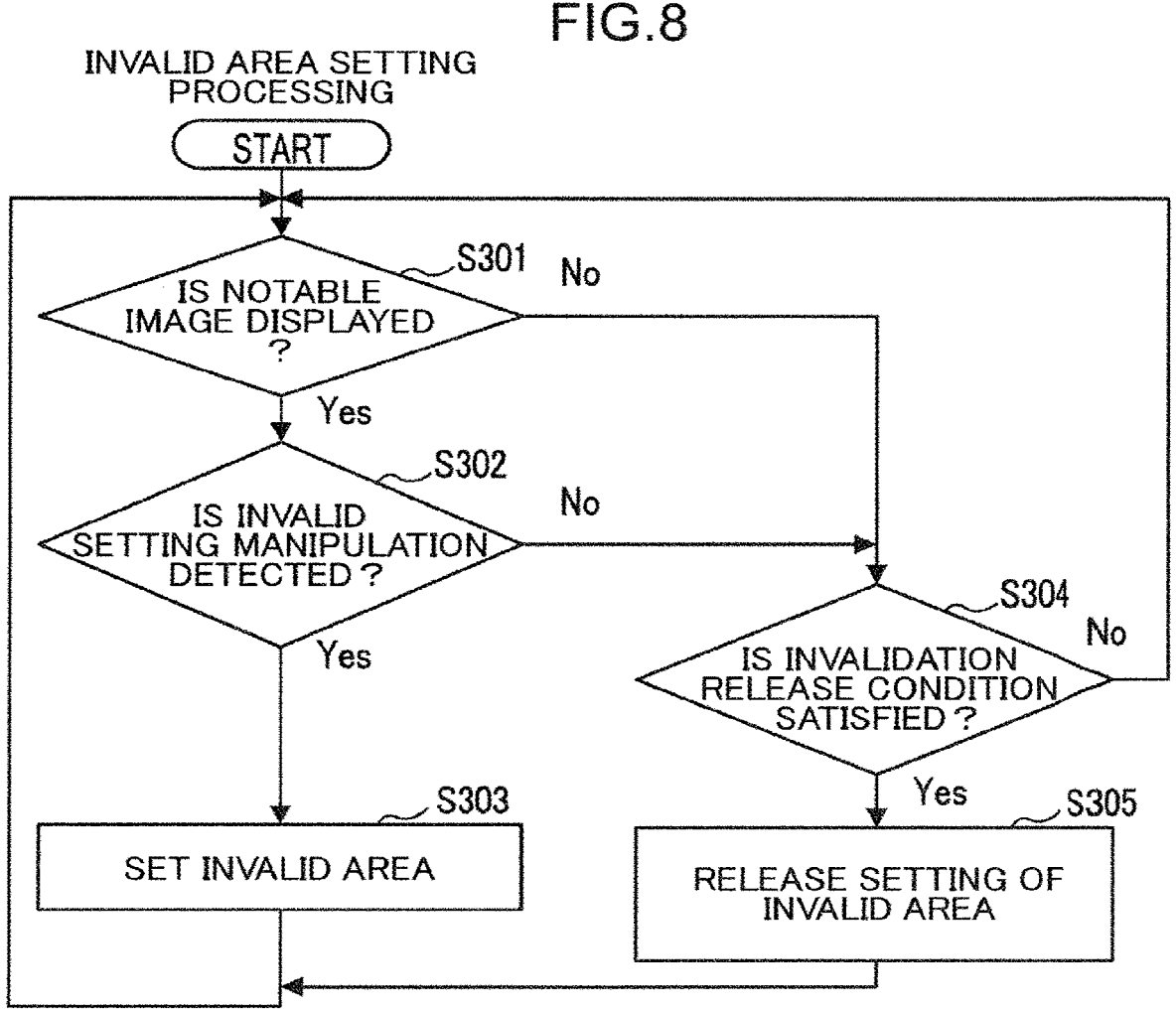
FIG. 8 is a flowchart showing one example of a procedure for invalid area setting processing in the crane according to the embodiment.

Furthermore, the invalid area setting unit 65 automatically releases the setting of the invalid area when the predetermined invalidation release condition is satisfied (see process S305 of FIG. 8). With this operation, unnecessary maintenance of the setting of the invalid area is avoided, and safety is ensured.

First Application Example

Hereinafter, a first application example of the crane 10 will be described. In addition to the configuration of the crane 10, the crane according to this application example further includes a motion sensor and a camera corresponding to a first winch monitoring area, and a motion sensor and a camera corresponding to a second winch monitoring area.

The first winch monitoring area is an area including the first winch device 161 and surroundings thereof, and the second winch monitoring area is an area including the second winch device 162 and surroundings thereof.

In this application example, the state determination unit 62 also makes determination similar to determination of the suspended state and the standby state about the slewing motor 441 on the hydraulic motor of each of the first winch device 161 and the second winch device 162.

Furthermore, on determination that the state of the hydraulic motor corresponding to the first winch device 161 or the second winch device 162 is the standby state, the display control unit 64 in this application example executes automatic image output to automatically cause the display device 7 to display the monitoring image corresponding to the first winch monitoring area or the second winch monitoring area in which the obstacle is detected.

Meanwhile, on determination that the state of the hydraulic motor corresponding to the first winch device 161 or the second winch device 162 is the suspended state, the display control unit 64 in this application example does not execute the automatic image output.

When this application example is adopted, effects obtained in the monitoring around the upper slewing body 12 are similarly obtained in the monitoring around the first winch device 161 or the second winch device 162.

Second Application Example

Hereinafter, a second application example of the crane 10 will be described. The crane according to this application example has a configuration in which the seven TOF sensor units 454a to 454g in the crane 10 are replaced with a stereo camera device that measures the three-dimensional position of the obstacle.

The stereo camera device includes one pair of cameras that captures the monitoring area T0 from different directions, and an image processing device that calculates the three-dimensional position of an object (moving object or stationary object) by image processing on one pair of captured images obtained by the one pair of cameras.

When the calculated three-dimensional position is within the designated area, the image processing device outputs the three-dimensional position as the position of the obstacle to the controller 6.

In this application example, one of the one pair of cameras in the stereo camera device may be configured to also serve as the camera 46 that captures the monitoring image.

Third Application Example

Hereinafter, a third application example of the crane 10 will be described. The crane according to this application example has a configuration in which the hydraulic pump unit 42, the pilot pressure valve 43x, and the hydraulic actuator 44 in the crane 10 are replaced with a generator, a power supply circuit, a power supply cutoff circuit, and an electric actuator, respectively. In this application example, the slewing motor 441 is an electric motor.

The generator generates electric power by being driven by the engine 41, and supplies the electric power to the power supply circuit and the power supply cutoff circuit.

The slewing control unit 63 in this application example controls power supply from the power supply circuit to the electric motor such as the slewing motor 441 in response to the slewing manipulation on the slewing manipulation device 52. The power supply cutoff circuit switches from one of a cutoff state for cutting off a power supply line from the power supply circuit to the slewing motor 441 and a connection state for connecting the power supply line to the other in response to the control by the main control unit 61.

The main control unit 61 switches the power supply cutoff circuit from the connection state to the cutoff state in response to the cutoff manipulation on the boarding and alighting cutoff lever 511, and switches the power supply cutoff circuit from the cutoff state to the connection state in response to the connection manipulation on the boarding and alighting cutoff lever 511.

In this application example, the main control unit 61 and the power supply cutoff circuit are one example of a state switching unit that shifts the state of the slewing motor 441 from the suspended state to the standby state in response to the preparatory manipulation on the boarding and alighting cutoff lever 511. Note that a mechanical mechanism that changes the state of the power supply cutoff circuit according to displacement of the boarding and alighting cutoff lever 511 may be adopted instead of the main control unit 61.

Note that in the embodiment and the application example thereof, the work machine is a crane, but the work machine may be another work machine such as a hydraulic excavator.

In addition, in the embodiment and the application example thereof, the upper slewing body 12 constitutes the movable part in the present invention, but is not limited to such an aspect. The movable part may include parts of the upper slewing body 12 excluding, for example, at least one of the cab 13, the gantry 15, the winch device 16, and the counterweight 17. In addition, the movable part may be another part other than the upper slewing body 12.

The invention claimed is:

1. A work machine comprising:
a movable part;
an actuator that drives the movable part;
a drive manipulation unit that receives a drive manipulation instructing the actuator to operate;
a drive control unit that controls the operation of the actuator in response to the drive manipulation;
a preparatory manipulation unit that receives a preparatory manipulation instructing the actuator to prepare for the operation;
a state switching unit that shifts a state of the actuator in response to the preparatory manipulation from a suspended state in which the actuator is blocked from being started by control of the drive control unit to a standby state in which the actuator is able to be started by the control of the drive control unit;
a display device configured to display an image;
an obstacle detection device that detects an obstacle existing in one or more monitoring areas that are set to correspond to the movable part;
a state determination unit that determines whether the state of the actuator is the standby state or the suspended state under circumstances where the actuator is at a stop; and
a display control unit,
wherein on determination that the state of the actuator is the standby state, the display control unit executes automatic image output that is processing for causing the display device to display a monitoring image that is an image corresponding to a monitoring area in which the obstacle is detected out of the one or more monitoring areas, and on determination that the state of the actuator is the suspended state, the display control unit stops the execution of the automatic image output and does not cause the display device to display the monitoring image.

2. The work machine according to claim 1, wherein
the actuator includes a hydraulic actuator,
the drive control unit includes a hydraulic control valve that controls supply of working oil to the hydraulic actuator,
the state switching unit includes a pilot pressure valve configured to be able to switch from a blocking state to an allowable state in response to the preparatory manipulation, the blocking state is a state of blocking pilot pressure from acting on the hydraulic control valve, and the allowable state is a state in which the pilot pressure is allowed to act on the hydraulic control valve,
the standby state is a state of the actuator when the pilot pressure is allowed to act on the hydraulic control valve due to the pilot pressure valve being in the allowable state, and the suspended state is a state of the actuator when the pilot pressure is blocked from acting on the hydraulic control valve due to the pilot pressure valve being in the blocking state.

3. A work machine comprising:
a movable part;
an actuator that drives the movable part;
a drive manipulation unit that receives a drive manipulation instructing the actuator to operate;
a drive control unit that controls the operation of the actuator in response to the drive manipulation;
a preparatory manipulation unit that receives a preparatory manipulation instructing the actuator to prepare for the operation;
a state switching unit that shifts a state of the actuator in response to the preparatory manipulation from a suspended state in which the actuator is blocked from being started by control of the drive control unit to a standby state in which the actuator is able to be started by the control of the drive control unit;
a display device configured to display an image;
an obstacle detection device that detects an obstacle existing in one or more monitoring areas that are set to correspond to the movable part;
a state determination unit that determines whether the state of the actuator is the standby state or the suspended state under circumstances where the actuator is at a stop; and
a display control unit,
wherein on determination that the state of the actuator is the standby state, the display control unit executes automatic image output that is processing for causing the display device to display a monitoring image that is an image corresponding to a monitoring area in which the obstacle is detected out of the one or more monitoring areas, and on determination that the state of the actuator is the suspended state, the display control unit stops the execution of the automatic image output,
the obstacle detection device is configured to be able to detect a position of the obstacle in the one or more monitoring areas,
the work machine further includes an invalid area setting unit,
the invalid area setting unit is configured to set an invalid area when a predetermined invalid setting manipulation is detected under circumstances where the obstacle is detected when the actuator is at a stop, and the monitoring image of the monitoring area in which the obstacle is detected out of the one or more monitoring areas is displayed on the display device, the invalid area being an area including the position of the obstacle detected in the monitoring area corresponding to the monitoring image displayed on the display device,
when the invalid area is set, the display control unit does not execute the automatic image output in response to the detection of the obstacle in the invalid area, and
the invalid area setting unit releases the setting of the invalid area when a predetermined invalidation release condition is satisfied.

4. The work machine according to claim 3, wherein
the drive manipulation unit is configured to receive a predetermined suspend manipulation,
the state switching unit is configured to be able to shift the state of the actuator from the standby state to the suspended state in response to the suspend manipulation, and
the invalidation release condition includes a condition that the state of the actuator has shifted from the standby state to the suspended state.

5. A work machine comprising:
a movable part;
an actuator that drives the movable part;
a drive manipulation unit that receives a drive manipulation instructing the actuator to operate;
a drive control unit that controls the operation of the actuator in response to the drive manipulation;
a preparatory manipulation unit that receives a preparatory manipulation instructing the actuator to prepare for the operation;
a state switching unit that shifts a state of the actuator in response to the preparatory manipulation from a suspended state in which the actuator is blocked from being started by control of the drive control unit to a standby state in which the actuator is able to be started by the control of the drive control unit;

a display device configured to display an image;

an obstacle detection device that detects an obstacle existing in one or more monitoring areas that are set to correspond to the movable part;

a state determination unit that determines whether the state of the actuator is the standby state or the suspended state under circumstances where the actuator is at a stop; and a display control unit, wherein on determination that the state of the actuator is the standby state, the display control unit executes automatic image output that is processing for causing the display device to display a monitoring image that is an image corresponding to a monitoring area in which the obstacle is detected out of the one or more monitoring areas, and on determination that the state of the actuator is the suspended state, the display control unit stops the execution of the automatic image output, the movable part is a slewing body that is slewably located on an upper part of a lower base and is coupled with a boom that supports a rope that suspends a hoist load, the actuator is a slewing motor that drives the slewing body, the one or more monitoring areas include one or more first monitoring areas with respect to the slewing body, and one or more second monitoring areas set at places remoter from the slewing body than the one or more first monitoring areas, the obstacle detection device is configured to detect the obstacle individually in the one or more first monitoring areas and the one or more second monitoring areas, and the drive control unit performs slewing interlock processing that is processing for prohibiting start of the slewing motor when the obstacle is detected in the one or more first monitoring areas.

6. The work machine according to claim 5, further comprising a slewing brake device configured to be able to switch between a brake state of applying braking force to the slewing body in response to a predetermined brake manipulation, and a brake release state of releasing the application of the braking force to the slewing body in response to a predetermined brake release manipulation, wherein the automatic image output includes: first automatic image output that is processing for causing the display device to display a monitoring image corresponding to a first monitoring area in which the obstacle is detected out of the one or more first monitoring areas; and second automatic image output that is processing for causing the display device to display a monitoring image corresponding to a second monitoring area in which the obstacle is detected out of the one or more second monitoring areas, and in a case where the slewing brake device is in the brake state when the stewing motor is at a stop, the display control unit executes the first automatic image output, and in a case where the slewing brake device is in the brake release state under circumstances where the start of the slewing motor is not prohibited when the slewing motor is at a stop, the display control unit executes the second automatic image output without executin the first automatic image output.

7. The work machine according to claim 5, wherein the one or more first monitoring areas include one first monitoring area that is set to correspond to one of two slewing directions of the slewing body, and another first monitoring area that is set to correspond to another of the two slewing directions, the obstacle detection device is configured to detect the obstacle individually in the one first monitoring area and the other first monitoring area, and when the slewing interlock processing prohibits the start of the slewing motor under circumstances where the obstacle is detected in the one first monitoring area and the other first monitoring area, the display control unit causes the display device to display the monitoring image of the first monitoring area corresponding to an instruction direction of stewing the stewing body by the drive manipulation in preference to other monitoring images when the drive manipulation instructing drive of the stewing body is performed.

8. The work machine according to claim 5, wherein the obstacle detection device is configured to be able to detect a position of the obstacle in the one or more monitoring areas, the one or more first monitoring areas include a plurality of first monitoring areas, and when the slewing interlock processing prohibits the start of the slewing motor and the drive manipulation is not performed under circumstances where the obstacle is detected in each of two or more first monitoring areas of the plurality of first monitoring areas, the display control unit causes the display device to display the monitoring image corresponding to the obstacle detected at a position closest to a predetermined reference position in the slewing body out of the obstacles detected in the two or more first monitoring areas.

9. The work machine according to claim 1, wherein the obstacle detection device includes one or more TOP sensors that detect a three-dimensional position of the obstacle in a visual field range.

10. An image display control method for a work machine, the work machine including:

a movable part;

an actuator that drives the movable part;

a drive manipulation unit that receives a drive manipulation instructing the actuator to operate;

a drive control unit that controls the operation of the actuator in response to the drive manipulation;

a preparatory manipulation unit that receives a preparatory manipulation instructing the actuator to prepare for the operation;

a state switching unit that shifts a state of the actuator in response to the preparatory manipulation from a suspended state in which the actuator is blocked from being started by control of the drive control unit to a standby state in which the actuator is able to be started by the control of the drive control unit;

a display device configured to display an image; and an obstacle detection device that detects an obstacle existing in one or more monitoring areas that are set to correspond to the movable part, the image display control method comprising, as processes to be executed by a processor included in the work machine:

a first process of determining whether the state of the actuator is the standby state or the suspended state under circumstances where the actuator is at a stop; and a second process, wherein on determination in the first process that the state of the actuator is the standby state, automatic image output is executed in the second process, the automatic image output being processing for causing the display device to display a monitoring image corresponding to a monitoring area in which the obstacle is detected out of the one or more monitoring areas, and on determination in the first process that the state of the actuator is the suspended state, the execution of the automatic image output is stopped in the second process and the monitoring image is not displayed on the display device.

* * * * *